United States Patent [19]
Brown

[11] Patent Number: 5,522,283
[45] Date of Patent: Jun. 4, 1996

[54] CIRCULAR SAW LEVELING AND TENSIONING MACHINE

[75] Inventor: Ernest W. Brown, Texarkana, Ark.

[73] Assignee: International Paper Company, Purchase, N.Y.

[21] Appl. No.: 370,174

[22] Filed: Jan. 9, 1995

[51] Int. Cl.$^6$ .................................................. B23D 63/18
[52] U.S. Cl. ......................................... 76/27; 76/25.1
[58] Field of Search .............................. 76/25.1, 26, 27; 72/176, 226

[56] References Cited

U.S. PATENT DOCUMENTS

| 510,210 | 12/1893 | Toomer . | |
|---|---|---|---|
| 1,053,746 | 2/1913 | Roach . | |
| 1,096,756 | 5/1914 | Roach . | |
| 1,290,491 | 1/1919 | Blackwell . | |
| 3,964,348 | 6/1976 | Dawson | 76/26 |
| 4,085,630 | 4/1978 | Williams | 76/27 |
| 4,852,430 | 8/1989 | Oppliger et al. | 76/27 |
| 4,875,393 | 10/1989 | Williams | 76/27 |
| 5,269,205 | 12/1993 | Oppliger | 76/27 |

FOREIGN PATENT DOCUMENTS

| 210713 | 10/1957 | Australia | 76/27 |
|---|---|---|---|
| 2229493 | 12/1974 | France | 76/27 |

Primary Examiner—Hwei-Siu Payer
Attorney, Agent, or Firm—Klarquist Sparkman Campbell Leigh & Whinston

[57] ABSTRACT

A circular saw blade straightening and tensioning machine has a set of straightening and tensioning rollers on both sides of a saw blade. The rollers are mounted on parallel shafts. Each shaft has a hub at its end, comprising a center portion horizontally eccentric with respect to the center line of the shaft, and a pair of side portions disposed on opposite sides of the center portion. Each of the side portions is horizontally eccentric with respect to the shaft center line, but in a direction opposite to that of the center portion. A roller is rotatably mounted on each of the center and side portions of the hubs. An actuator rotates each of the upper and lower shafts selectively ninety degrees in both the clockwise and counterclockwise directions. Rotation of the shafts selectively force a center roller against one surface of the saw blade while simultaneously forcing the side rollers against the other surface of the saw blade, thereby to level deformations in the blade. Rotation of the shafts in opposite directions forces the center rollers on both shafts against both surfaces of the saw blade, thereby to tension the blade. A sensor includes a movable foot pivotably mounted intermediate four fixed foot supports. The movable foot carries a gauge that measures the deviation underneath the movable foot from the plane determined by the fixed supports.

14 Claims, 19 Drawing Sheets

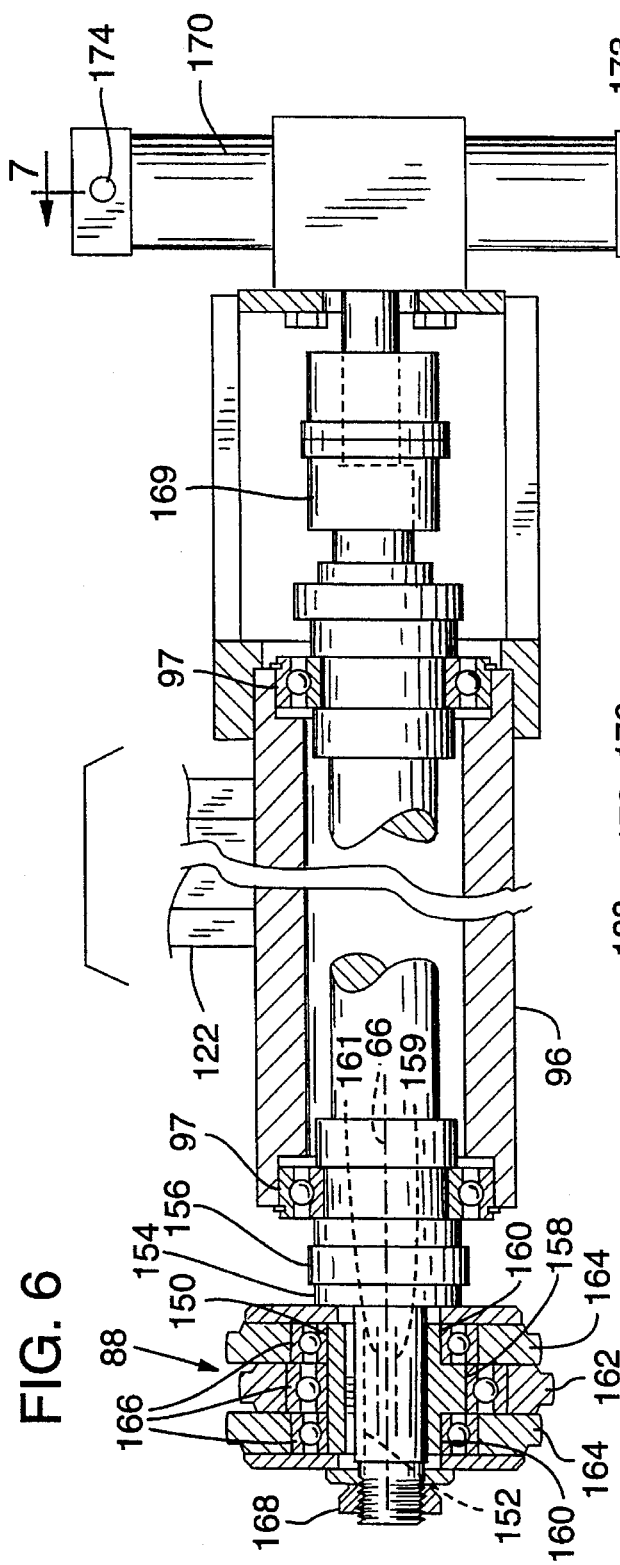
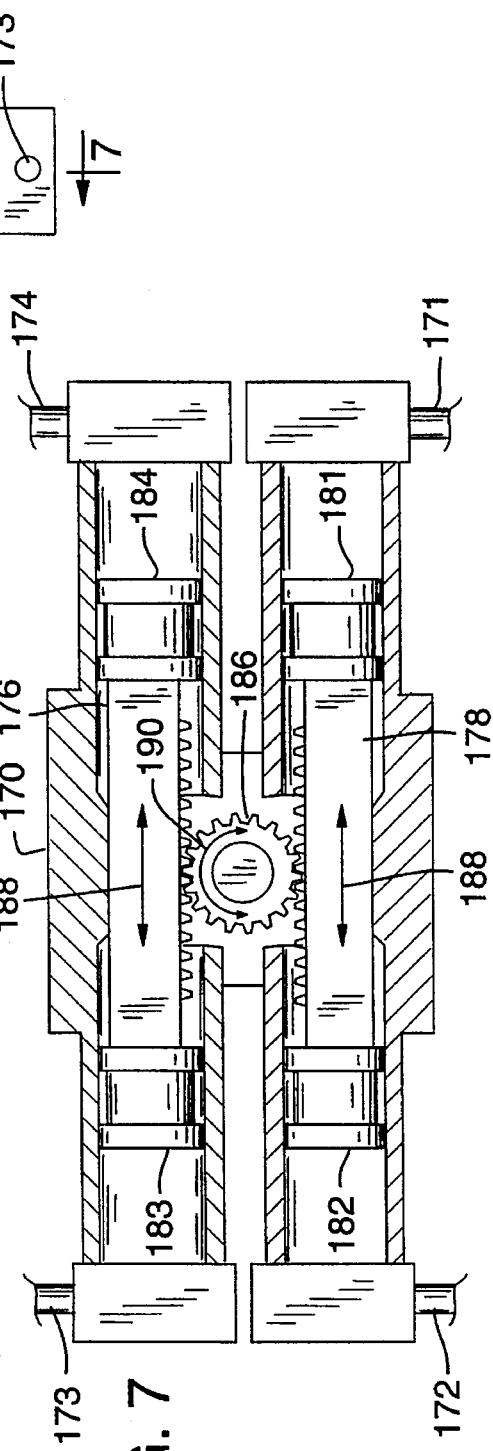
FIG. 6
FIG. 7

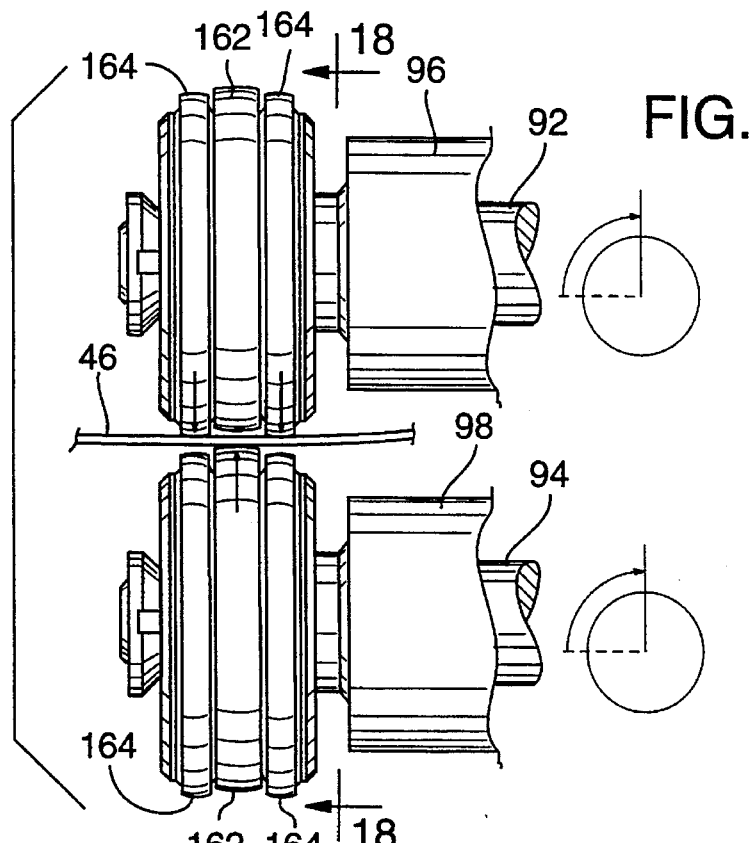
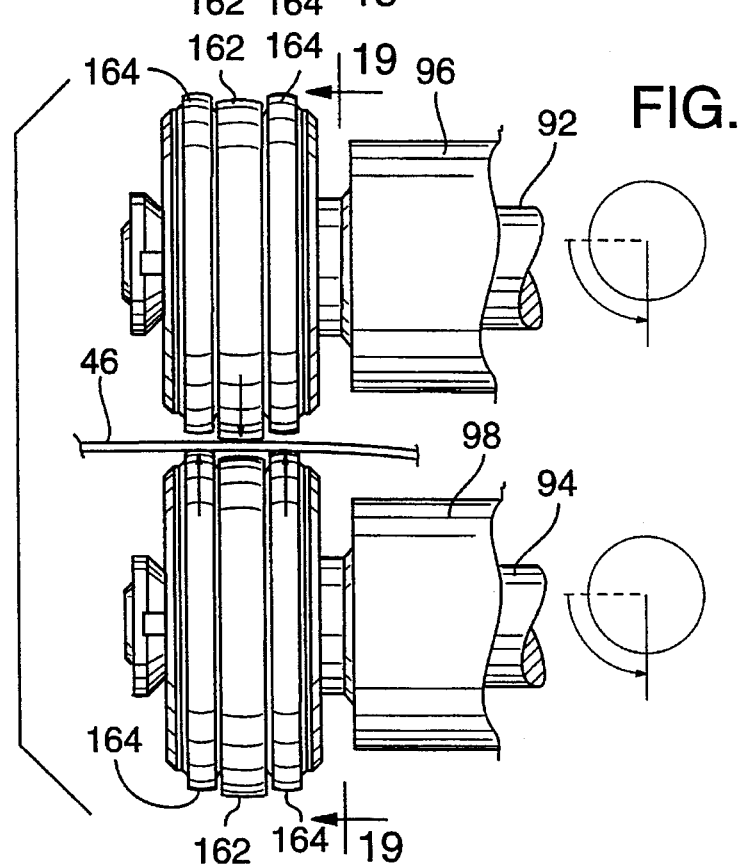

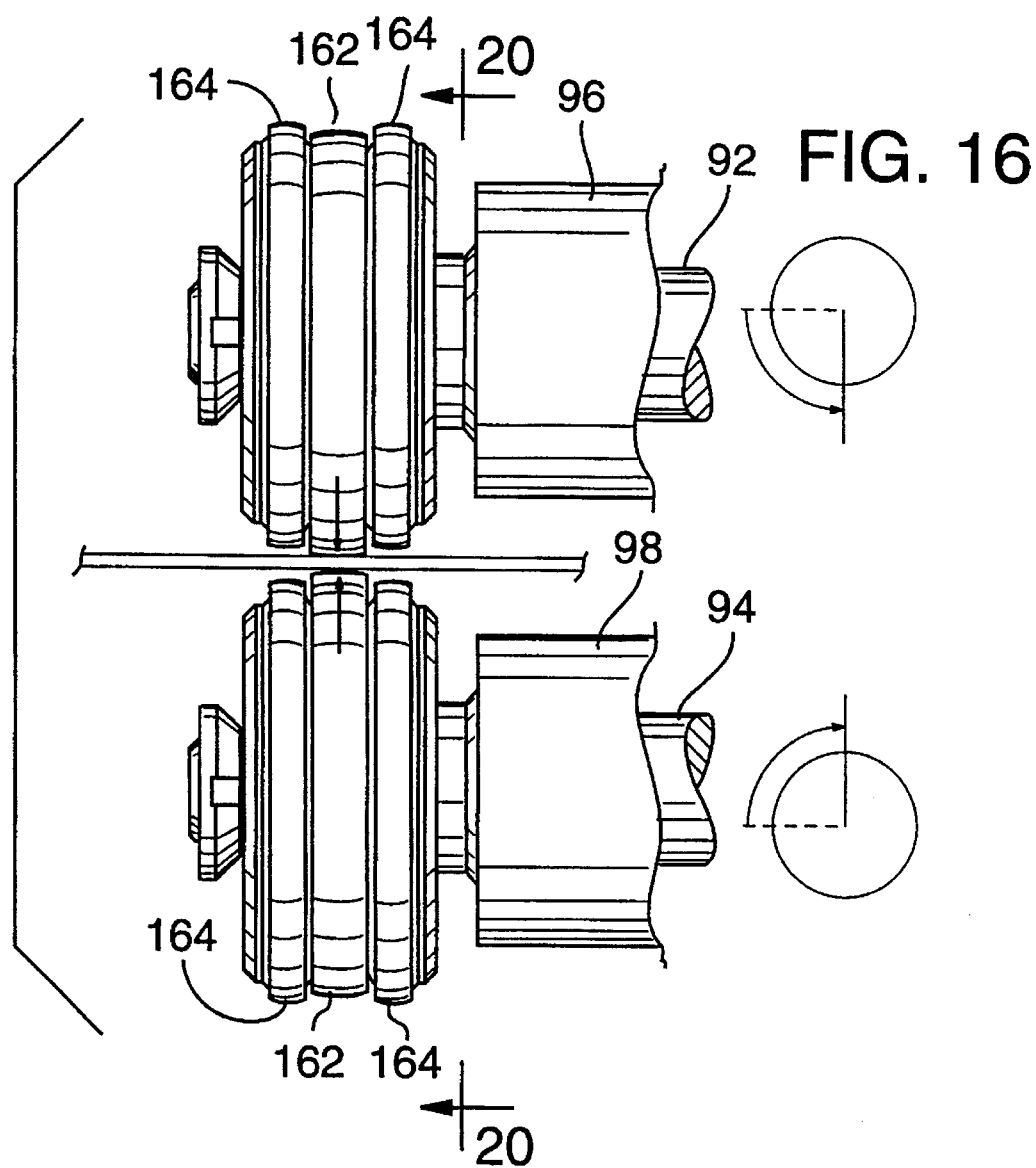

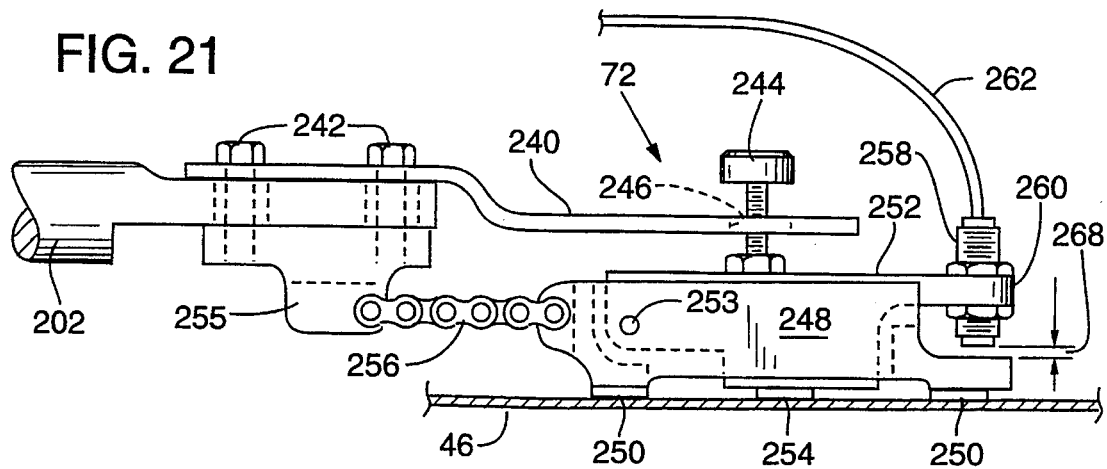
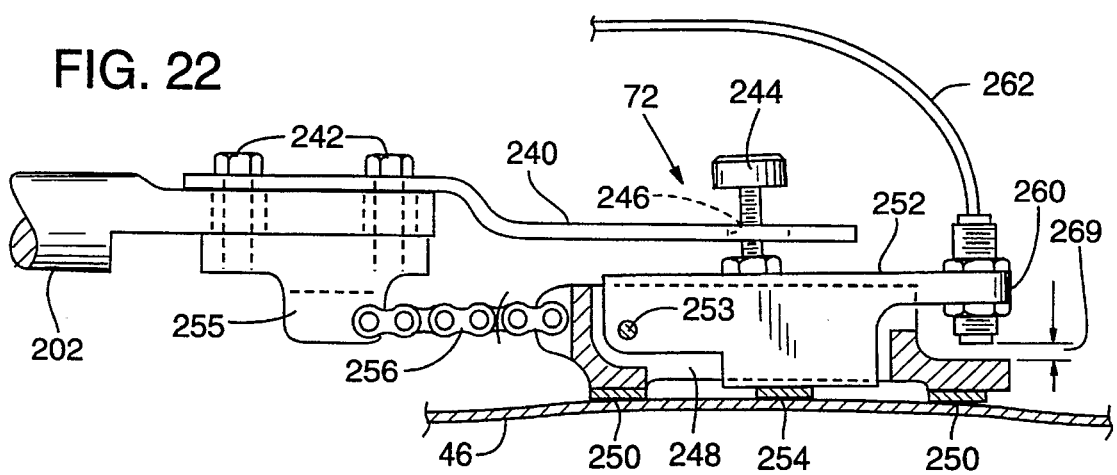
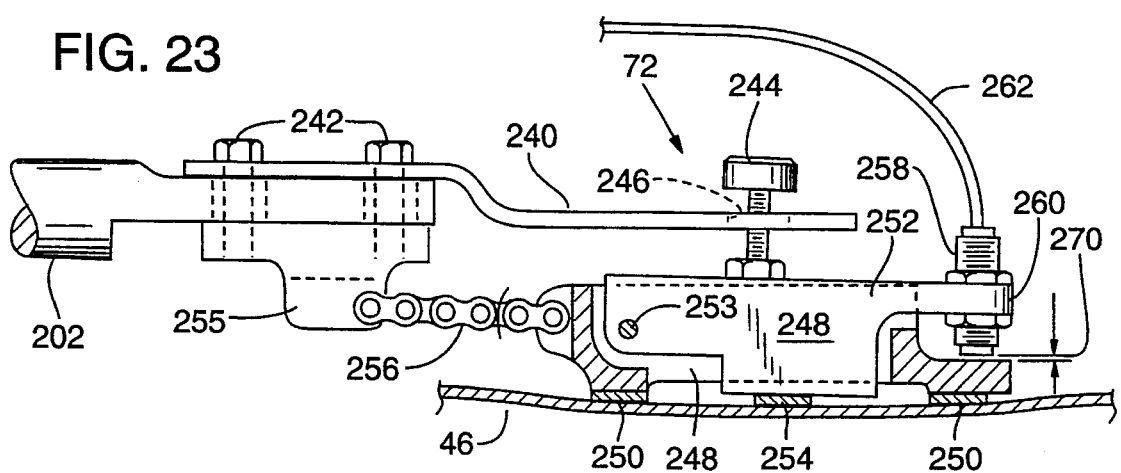

CIRCULAR SAW LEVELING AND TENSIONING MACHINE

FIELD OF THE INVENTION

This invention relates to a circular saw blade straightening and tensioning machine for eliminating unevenness in and tensioning circular saw blades and, more particularly, to such a machine having straightening rollers disposed on both sides of the saw blade.

BACKGROUND OF THE INVENTION

When a circular saw operates at the high rate of rotation necessary to cut wood, the outer edges of the blade have a tendency to deviate from the cutting line, either to one side or the other, or to both sides, producing a wavy cut. There is also a tendency for the saw edge to start its cut to one side or the other of the intended line, whereupon the blade tends to lead the cut in that direction. Paradoxically, when the blade is stopped, it is found to be straight and true.

The uneven cutting above described is a result of invisible defects in the saw blade, which defects include both minute surface deformities and improper distribution of residual tension stresses in the blade. The centrifugal force which results from high-blade rotational speeds induces substantial tension stress in the blade. This tension is superimposed on any residual stresses in the blade, such that the resulting non-uniformity of tension produces uneven strain. Any irregularities in the blade surface also interfere with true running, as the tension changes when the blade approaches its cutting speed. Thus, a blade may be deflected from a true course by either of these types of defects.

Areas on the surface of a blade wherein residual tension stresses vary significantly from the normal tension level in that portion of the blade are commonly referred to as "tight" or "loose" spots. Surface deformities as above noted include convex and concave deviations from a flat plane, including bulges, ridges, kinks, etc. Consequently, a critical part of the maintenance of circular saws is removing these dents or bends, i.e., leveling, as well as tuning the saw plate to operate at typical rotational speeds by stretching the plate in specifically determined locations to cause tension at the periphery of the saw plate, i.e., tensioning.

Leveling and tensioning operations have typically been done manually using various hammers, anvils and gauges. Indeed, several equipment manufacturers build "stretcher rolls" which assist in such manual tensioning and leveling of saw blades.

Manual tensioning and leveling is a highly skilled craft requiring intuitive analyses of problems and the development of unique solutions. Workers who do this are known as sawsmiths. They are among the highest paid of all shop trades. Because of the great skill required, the number of sawsmiths practicing this trade has remained greatly limited and the craft has often been practiced in secret. Besides the hammers, anvils, straight edges and other tools, the sawsmith must utilize his senses. These must be trained by long experience such that he can inspect a saw blade for imperfections, mark the blade as to type and location of imperfections, and then employ the proper hammering patterns and tools to remove the imperfections from the saw. Proper hammering over both surfaces produces a more uniform tension distribution, as well as removing surface flaws, thereby to enable the saw to run straight and true at cutting speeds.

In order for a sawsmith properly to hammer a saw blade, generally he first bends it around an axis parallel to one of its diameters so that its surface takes the form of a curved cylindrical segment. This is called "dishing" the blade. The sawsmith then applies a straight edge to the blade surfaces at right angles to their curvature. The blade reveals to his practiced eye the nature and location of any defects. The sawsmith then marks each defect such that he may thereafter select those tools and techniques best suited for its correction. Typically, the sawsmith places the saw on an anvil and commences hammering the marked areas, guided only by his marks. Of course, he must be extremely careful to hammer in the proper manner and in the correct location. While performing this rectifying operation, the sawsmith may also hammer generally over the entire surface of the saw blade, thereby to obtain an overall distribution of tension appropriate to the particular blade involved.

When he applies his straight edge as above described, the sawsmith actually is locating bulges and depressions representing either physical distortions or "tight" or "loose" spots on the surface of the blade. Tight spots on the blade surface tend to bulge inwardly from the concave surface when the saw is bent or dished. Similarly, loose spots tend to bulge outwardly. When the blade is laid flat, such areas generally cannot be detected. Kinks, ridges and other physical distortions in the blade can also be detected by the way they stand up under a straight edge. Additionally, the manner in which the saw blade actually curves when it is bent or dished is, to the skilled hand and eye of the sawsmith, a measure of the overall tension distribution in the saw. As can be readily understood, proper leveling and tensioning of a saw blade is a highly skilled art, the cost of which is quite significant.

In view of the cost inherent in proper manual hammering of a saw, it was natural that the trade would attempt to create a machine which could accomplish such hammering at lesser cost. U.S. Pat. No. 510,210 was an early attempt at achieving a device which could be used to straighten circular saws. The apparatus therein disclosed provided rollers or blocks on both sides of the saw blade which were so disposed in relation to one another that the blade could be deformed in a direction opposite to that of the distortion.

U.S. Pat. No. 1,053,746 disclosed a similar machine utilizing rollers which moved toward and away from each other. The rollers were arranged to take a circular course over the surface of the saw, or, alternatively, a spiral course, in which case they could automatically feed the saw. Transverse movements of the saw-supporting structure were themselves monitored by a hand lever. U.S. Pat. No. 1,096,756 disclosed an improvement to the '746 patent and, in particular, to the saw-supporting and saw-controlling structure thereof.

U.S. Pat. No. 1,290,491 disclosed another circular saw stretching and tensioning machine wherein a pair of straightening rollers were each coaxially mounted on shafts positioned parallel to the sides of the saw blade.

U.S. Pat. No. 3,964,348 disclosed a circular saw blade hammering machine utilizing a proximity detector and wherein the blade was dished to locate tight and loose portions. A hammer was utilized to strike the blade wherever a high spot was detected. The action of the hammer was meant to replicate that of the sawsmith during his manual operations.

U.S. Pat. No. 4,852,430 disclosed a band saw blade straightening machine with sensor means for scanning the surface of the blade and generating a signal responsive to unevenness therein. A straightening station with two pairs of straightening rollers was provided. The straightening rollers comprised two pairs of rollers. One pair had a roller disposed above the band saw with a convex roller surface for smoothing upwardly directed unevenness, and a roller with a concave rolling surface disposed opposite underneath the band saw. The other pair for smoothing downwardly directed unevenness had a roller disposed above the band saw with a concave rolling surface and a roller with a convex rolling surface disposed underneath. The machine, however, was unsuitable for circular saw blades because it is not possible to define straight pathways with straightening rollers and a sensor behind each on a circular saw blade.

U.S. Pat. No. 4,875,393 disclosed an apparatus having a pair of top rolls and a pair of bottom rolls with one of the top rolls and one of the bottom rolls in each pair being of larger diameter than the other of the pair in both top and bottom positions. By providing a pair of rolls at the top and a second pair at the bottom with one of the two rolls in each pair being larger in diameter than the other, better leverage was allegedly possible to distort a saw blade either up or down.

U.S. Pat. No. 5,269,205 disclosed still another saw blade straightening machine wherein the blade was scanned with an electronic indicator mounted with a fixed reference from a beam. This scanner or sensor is unable to supply proper usable information to the computer which governs the action of the pressing rollers. Specifically, referencing a sensor from a fixed beam fails to recognize that a typical defect in a saw blade is often actually the result of three bends.

For example, a bulge in an upper surface of a saw blade is often the result of two concave deformations, which cause a convex deformation therebetween. The sensor disclosed in the '205 patent is unable to detect the fact that, in many such cases, only the concave areas are the actual defective areas, the apparent bulge being in fact a convex area, which is the natural result of the concave areas on either side. A sensor referenced from a fixed beam can only find and attempt to correct the convex area between the two concave areas.

Furthermore, the sensor disclosed in the '205 patent must be calibrated for each plate thickness. Also, the sensor disclosed has a very tiny contact point which is vulnerable to wear-related errors. Also, a properly tensioned saw plate may sag at its periphery when positioned horizontally and supported only at its center eye. The '205 patent sensor detects this condition as a very long dent down and, consequently, relays erroneous information to the computer.

Additionally, the '205 patent machine requires two complete sets of rollers, one set and all its supporting assemblies to push a convex deformation downwardly, and an additional set of rollers with an additional set of supporting assemblies to push a concave deformation upwardly.

OBJECTS OF THE INVENTION

Accordingly, it is an object of the present invention to provide a circular saw blade straightening and tensioning machine requiring only one set of rollers and only one supporting assembly therefor.

It is a further object of the invention to provide a circular saw blade straightening and tensioning machine with a single set of unique straightening rollers that can push a dent up, push it down, or stretch the plate, depending upon the particular need.

It is a further object of the invention to provide a circular saw blade straightening and tensioning machine with a sensor that can identify the actual bend area, rather than merely locating a deflected area in the plate.

It is a further object of the present invention to provide a circular saw blade straightening and tensioning machine having a floating sensor instead of a sensor referencing from a fixed beam, the floating sensor being able to detect deformations including concave regions which cause a convex area therebetween, thereby to be able to work each area individually as required.

It is a still further object of the present invention to provide a circular saw blade straightening and tensioning machine wherein the sensor does not have to be calibrated for different plate thicknesses.

It is a still further object of the present invention to provide a circular saw blade straightening and tensioning machine as above described wherein the sensor has large carbide wear surfaces having a very long life cycle.

It is a still further object of the present invention to provide a circular saw blade straightening and tensioning machine wherein the sensor is able to distinguish between a saw blade having deformations therein that require correction and a properly tensioned saw blade which sags at its periphery merely because of the way it is supported.

SUMMARY OF THE INVENTION

My circular saw blade straightening and tensioning machine comprises a mounting adapted rotatably to support a circular saw blade. A single set of rollers is provided, which set includes rollers adapted to be disposed on both sides of the saw blade. The axis of the set in its operating position is concurrent with a radius of the saw blade. The set is movable along the radius from the center to the periphery thereof. The roller set includes an upper shaft and a lower shaft. Each of the upper and lower shafts is disposed parallel to the upper and lower surfaces of the saw blade, respectively.

A hub is mounted on one end of each of the upper and lower shafts of the roller set. Each of the hubs includes a center portion horizontally offset or eccentric with respect to the centerline of its respective shaft, and a pair of side portions disposed on opposite sides of the center portion. Each of the side portions is also horizontally offset or eccentric with respect to the centerline of its respective shaft, but in a direction opposite to that of the center portion. A roller is rotatably mounted on each of the center and side portions of each of the hubs. Each of the rollers has the same outer diameter.

An actuator is provided to rotate each of the upper and lower shafts selectively ninety degrees in the clockwise and counterclockwise directions. The actuator provides the necessary deforming force.

Rotation by the actuator of the upper shaft in one of the clockwise and counterclockwise directions forces the rollers on the side portions of the hub on the upper shaft downwardly against the upper surface of the saw blade. Simultaneous rotation of the lower shaft by the actuator in the same direction forces the roller on the center portion of the hub on the lower shaft upwardly against the lower surface of the saw blade. The downward movement of the rollers on the side portions of the hub on the upper shaft combines with the upward movement of the roller on the center portion of the hub on the lower shaft to force upwardly a downwardly extending unevenness in the saw blade.

Similarly, rotation of the upper shaft by the actuator in the other of the clockwise and counterclockwise directions forces the roller on the center portion of the hub on the upper shaft downwardly against the upper surface of the saw blade.

Simultaneous rotation of the lower shaft by the actuator in the same direction forces the rollers on the side portions of the hub on the lower shaft upwardly against the lower surface of the saw blade. The downward movement of the roller on the center portion of the hub on the upper shaft combines with the upward movement of the rollers on the side portions of the hub on the lower shaft to force downwardly an upwardly extending unevenness in the saw blade.

Furthermore, rotation of the lower shaft by the actuator in one of the clockwise and counterclockwise directions and simultaneous rotation of the upper shaft by the actuator in the other of the clockwise and counterclockwise directions forces the roller on the center portion of the hub on the upper shaft downwardly against the upper surface of the saw blade and the roller on the center portion of the hub on the lower shaft upwardly against the lower surface of the saw blade. The resulting downward movement of the roller on the center portion of the hub on the upper shaft combines with the upward movement on the roller on the center portion of the hub on the lower shaft to exert a compression force on the saw blade at the point of contact, thereby to tension the blade.

Finally, a sensor is provided to scan one surface of the saw blade in advance of the rollers. The sensor generates a signal to the set of rollers in the event of unevenness in the saw blade in either the upward or downward directions.

The sensor is adapted to move along a radius of the saw blade and to scan the upper surface thereof. The sensor includes a frame, preferably a rectangular frame, having at least three, and preferably four, fixed foot supports. These fixed foot supports have flat contact surfaces for sliding along the upper surface of the saw blade. The contact surfaces of the supports define a flat plane.

A movable foot is pivotally mounted from the frame centrally of the fixed supports. The movable or pivotable foot, which is also flat, contacts the upper surface of the saw blade intermediate the fixed supports at a point along the radius of the blade.

A gauge is connected to the movable or pivotable foot. The gauge can measure upward and downward deviation of the upper surface of the saw blade from the plane defined by the fixed supports along the radius of the blade. The gauge generates a signal proportional to such deviation. The rollers can then exert upward and downward pressure on the saw blade at such point as required, responsive to the signal.

The set of rollers and the sensor are displaceable by the same distance towards the center or towards the periphery of the saw blade, i.e., they are tied together to act at the same radial distance from the center of the saw. The sensor is positioned on a radius preferably ninety degrees in advance of the radius with which the axis of the set of rollers is concurrent.

The set of rollers is preferably mounted on a first carriage. The carriage is adapted to mesh with a ball screw or threaded spindle mounted on a base plate. The carriage is driven along the spindle by a motor adapted to rotate the same. Rotation of the spindle by the motor drives the carriage to move the set of rollers along a radius of the blade.

The sensor is preferably mounted on a second carriage which itself is mounted on a track mounted on the baseplate. The track preferably makes an angle of ninety degrees with the axis of the threaded spindle. The second carriage is mounted on the track and is adapted to be driven therealong by chain means which connect the first and second carriages. Rotation of the spindle driving the first carriage in a direction toward or away from the center of the saw blade causes the chain means to pull the second carriage the same distance in the same direction.

The chain means preferably comprises a pair of sprockets coaxially mounted on the baseplate and adapted to rotate with respect thereto. A first chain is attached at its ends to the first carriage carrying the rollers, and such first chain is entrained around one of the sprockets of the pair in order to rotate the same. A second chain is attached at its ends to the second carriage on which the sensor is mounted. The second chain is entrained around the second of the sprockets of the pair and is adapted to be rotated thereby. In this manner, movement of the first carriage rotates the first chain and the first sprocket, which causes rotation of the second sprocket. This causes movement of the sensor on the second carriage a distance equal to the movement of the set of rollers on the first carriage.

The first carriage on which is mounted the set of rollers includes a first arm pivotally mounted thereto. The lower shaft of the set of rollers is supported by such first arm. A second arm is pivotally mounted to the first arm. The upper shaft of the set of rollers is supported by such second arm. In this manner, the upper and lower shafts of the set can be separated to permit the circular saw blade to be placed on its rotatable mounting and between the rollers.

A first air cylinder is mounted on the first arm carrying the lower shaft of the set of rollers. A piston is disposed within the first cylinder and a piston rod is attached to the piston. The rod extends downwardly to bottom on the first carriage on which is mounted the set of rollers. In this manner, retraction of the first piston rod permits the first arm to rotate downwardly to lower the lower shaft and the rollers mounted thereon. Similarly, extension of the piston rod rotates the first arm upwardly to raise the lower shaft and place the rollers mounted thereon adjacent the lower surface of the saw blade and in a working position.

A generally vertical extension is attached to the second arm carrying the upper shaft of the set of rollers. Such extension extends above the second arm. A second air cylinder is mounted on the extension and depends therefrom. A second piston is disposed within the second air cylinder and a second piston rod is attached at its upper end to the second piston. The second piston rod is attached at its lower end to the second arm. In this manner, retraction of the second piston rod rotates the second arm upwardly to raise the upper shaft and the rollers mounted thereon. Similarly, extension of the second piston rod rotates the second arm downwardly to lower the upper shaft and place the rollers mounted thereon adjacent the upper surface of the saw blade and in a working position.

Means are provided to introduce a selected amount of air pressure into the upper end of the second air cylinder upon extension of the second piston rod to limit the amount of force applicable by the actuator through the rollers against the upper and lower surfaces of the saw blade to the amount of air pressure so selected. In this manner, correction of deformations in the surface of the blade can be achieved in several stages.

BRIEF DESCRIPTION OF THE DRAWINGS

FIG. 6 is a sectional view taken on line 6—6 of FIG. 3.

FIG. 7 is a sectional view taken on line 7—7 of FIG. 6, illustrating schematically the actuator that rotates the upper and lower shafts.

FIG. 14 is a view similar to FIG. 13, illustrating the positions of the rollers when the actuators have rotated each of the upper and lower shafts ninety degrees in the clockwise direction.

FIG. 15 is a view similar to FIG. 13, illustrating the positions of the rollers when the actuators have rotated each of the upper and lower shafts ninety degrees in the counterclockwise direction.

FIG. 16 is a view similar to FIG. 13, illustrating the positions of the rollers when the actuators have rotated the upper shaft in the counterclockwise direction and the lower shaft in the clockwise direction.

FIG. 21 is an elevational view of the sensor, illustrating the positions of the fixed foot supports and the movable or pivotable foot when the sensor is in contact with a perfectly flat circular saw.

FIG. 22 is a view similar to FIG. 21, illustrating the sensor in contact with a blade deformed upwardly.

FIG. 23 is a view similar to FIGS. 21 and 22, illustrating the sensor in contact with a blade deformed downwardly.

Detailed Description of the Preferred Embodiment

Figure 1:
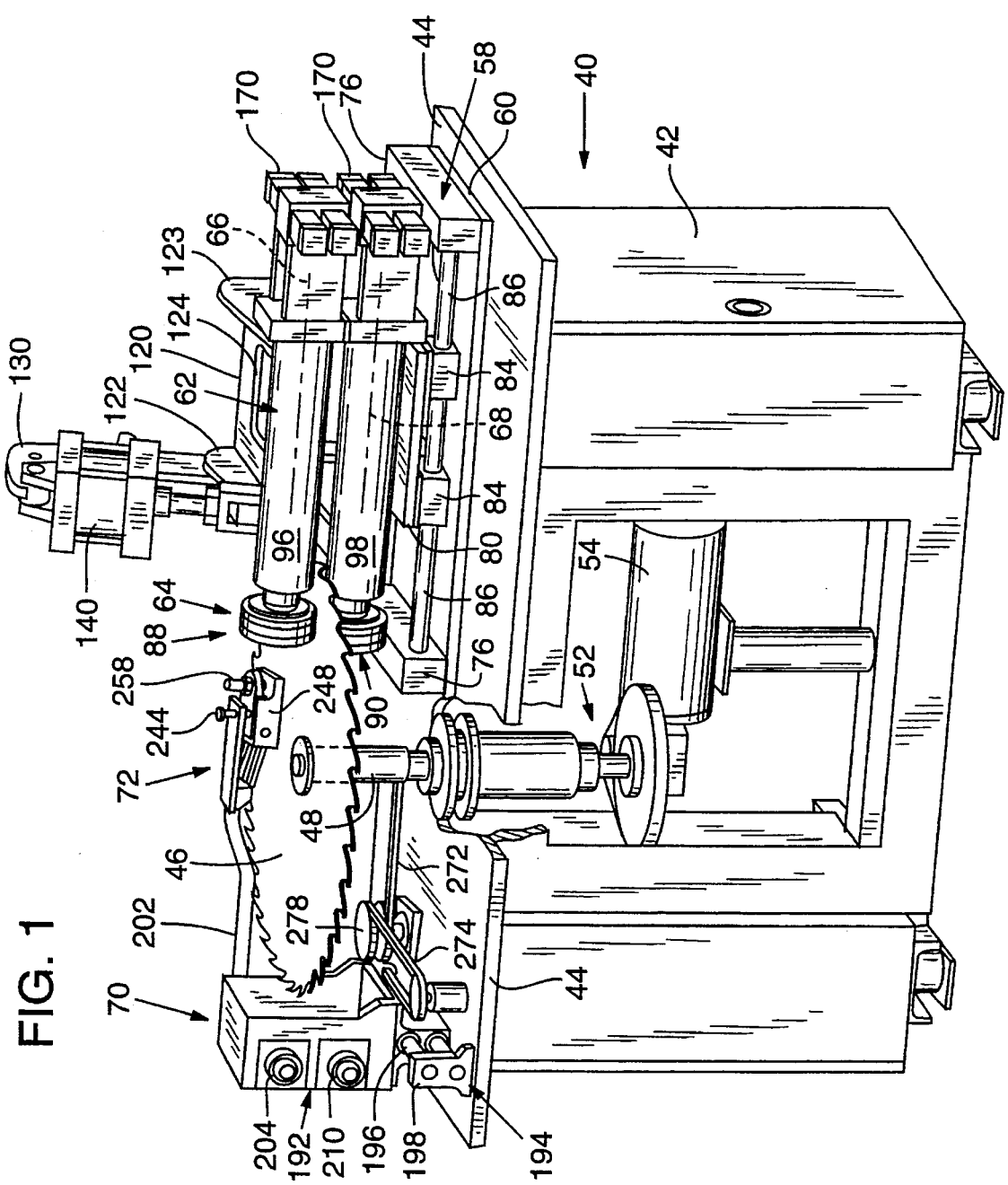
FIG. 1 is an overall representation, generally in perspective, of a preferred embodiment of the circular saw leveling and tensioning machine of the present invention.

Referring to the drawings, and particularly to FIG. 1, the circular saw leveling and tensioning machine 40 of the present invention includes a cabinet 42 having a frame or base plate 44 on which the principal components are mounted. A circular saw blade 46 is mounted on a vertical powered arbor 48 that is rotated clockwise (as indicated by arrow 50 in FIGS. 2 and 9) through a variable speed drive and reduction gear 52 by a motor 54. An encoder 56 (see FIGS. 8 and 28) tracks the saw rotation location.

A roller slide carriage assembly 58 is mounted on a plate 60 mounted on frame plate 44 and is designed to carry a straightening and tensioning press 62. The set is adapted to be disposed on both sides of saw blade 46 and carries two sets of rollers 64 on axes 66, 68, which are themselves concurrent with a radius of blade 46. A scanner carriage assembly 70 carrying a sensor 72 is also mounted on frame plate 44 and is adapted to move sensor 72 along a saw radius ninety degrees in advance of press 62. Sensor 72 is adapted to generate a signal to press 62 in the event of unevenness in saw blade 46 in either the upward or downward directions.

Roller Carriage Assembly

Roller carriage assembly 58 (the "first carriage") and press 62 are more fully illustrated in FIGS. 2, 3, 4, 5 and 6. As set forth hereinabove, and as clearly shown in FIG. 3, roller carriage assembly 58 is mounted on plate 60, which itself is mounted on frame plate 44. Carriage assembly 58 carries press 62 with rollers 64 along a radius of blade 46 ninety degrees in advance of sensor 72. A ball screw or threaded spindle 74 (FIG. 4) is rotatably mounted in supports 76 and is driven by a motor 78. Carriage 58 includes a plate 80 (FIG. 5) from which depends an internally threaded nut 82 that receives spindle 74 and by which plate 80 and carriage assembly 58 are driven selectively inwardly and outwardly (back and forth) along the radius of saw blade 46. Plate 80 also carries depending brackets 84 that ride on rails 86 mounted in supports 76, as shown.

As hereinabove mentioned, press 62 includes two sets of rollers 64, a set of upper rollers 88 and a set of lower rollers 90. Upper rollers 88 are mounted on an upper shaft 92, whose axis is axis 66. Lower rollers 90 are mounted on a lower shaft 94, whose axis is axis 68. Upper shaft 92 is mounted in an upper shaft housing 96, being rotatably supported by bearings 97. See FIG. 6. Lower shaft 94 is mounted in a lower shaft housing 98 and is similarly supported. See FIGS. 3 and 5.

Lower shaft housing 98 is attached to a "first arm," which comprises a plate 100 carried by lower arms 102, 103 pivotally mounted to carriage plate 80 in pivots 104. See FIGS. 2, 3 and 5. The pivoting action, which will be hereinafter described, permits the lower set of rollers 90 to be lowered from and raised to their working elevation.

A pneumatic cylinder 106 (FIGS. 3 and 5) is mounted on plate 100 by bolts 108. Cylinder 106 includes a piston 110 having a piston rod 112. A threaded adjustment bolt 114 screws into the lower end of rod 112 and is held in an adjustable desired position by a lock nut 116, as shown.

Figure 12:
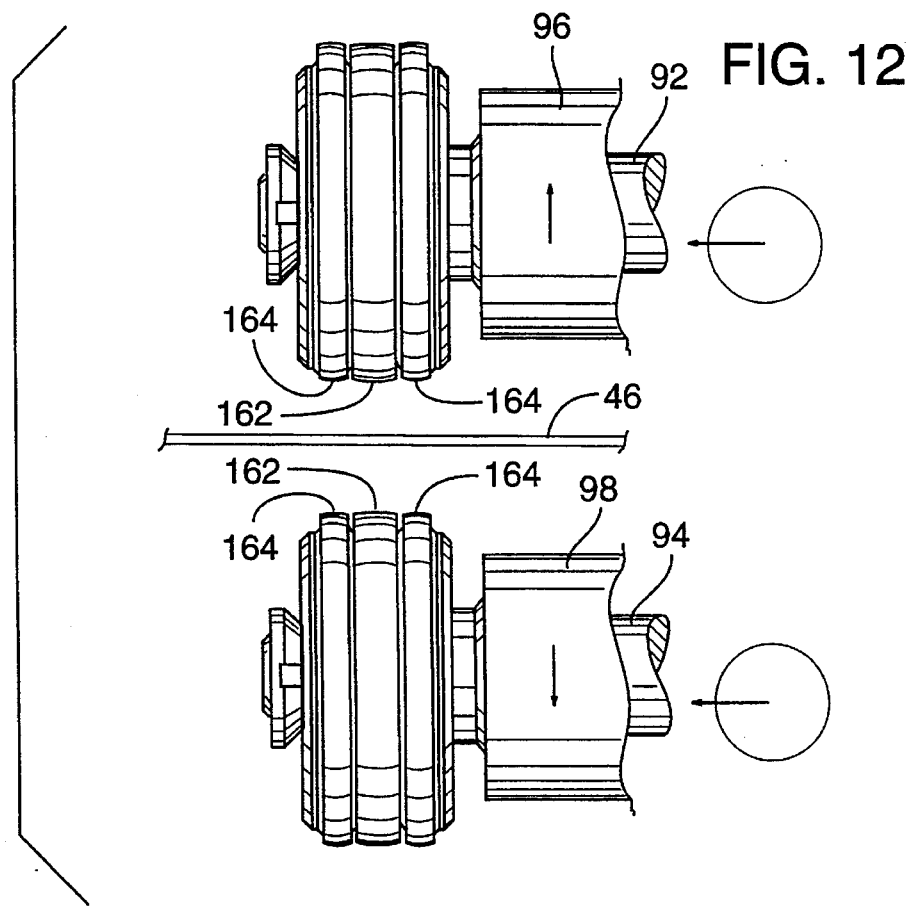
FIG. 12 illustrates the upper and lower shafts of the set of rollers in their separated position suitable for a saw change, the rollers being in their zero or neutral position prior to being rotated by the actuator.

Adjustment bolt 114 bottoms or sets on plate 80. In operation, pneumatic pressure introduced at 115 causes piston rod 112 and adjusting bolt 114 to extend, thereby to rotate plate 100 and arms 102, 103 to raise lower shaft 94 and its rollers 90 to their working position adjacent the lower surface of saw blade 46. This actually provides a small clearance 117 between rollers 90 and saw blade 46. See FIGS. 5 and 13. Cylinder 106 is single-acting so that when the air pressure is turned off, gravity alone lowers the assembly approximately three-quarters inch from its illustrated position to permit a saw blade to be placed in position. See FIG. 12. The pressure that accomplishes raising of the lower roller assembly to its working elevation is preferably adjustable to ensure a "soft" position.

Upper rollers 88, upper shaft 92 and upper shaft housing 96 are supported in a similar manner by a "second arm," which comprises a plate 120, which itself is carried by a pair of upper arms 122, 123 hinged, respectively, to arms 102, 103 at hinge points 126. See FIGS. 1, 2, 3 and 5.

Figure 5:
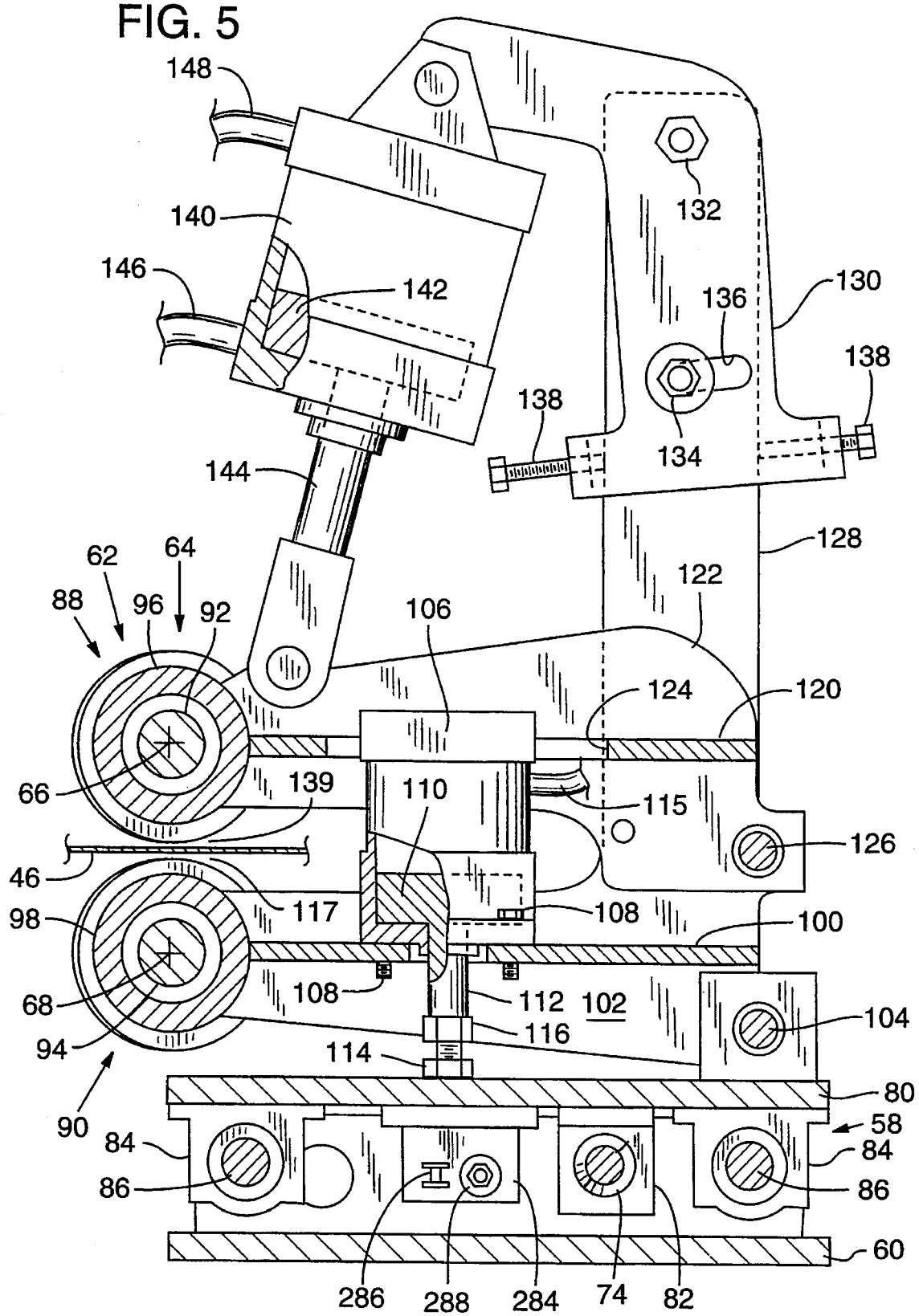
FIG. 5 is a sectional view taken on line 5—5 of FIG. 3.

Lower arm 102 extends upwardly in an "L"-shaped configuration, achieving an extension 128, as clearly shown in FIG. 5. An adjustment bracket 130 is bolted to extension 128 by bolts 132, 134, bolts 134 being received in a slotted hole 136 to permit rotational adjustment by adjusting screws 138. This allows a desired small clearance 139 to be set accurately between upper rollers 88 and saw blade 46. The adjustments on bolt 114 for lower arms 102, 103 and for adjusting screws 138 for bracket 130 need be set only one time and thereafter can be left alone.

Figure 13:
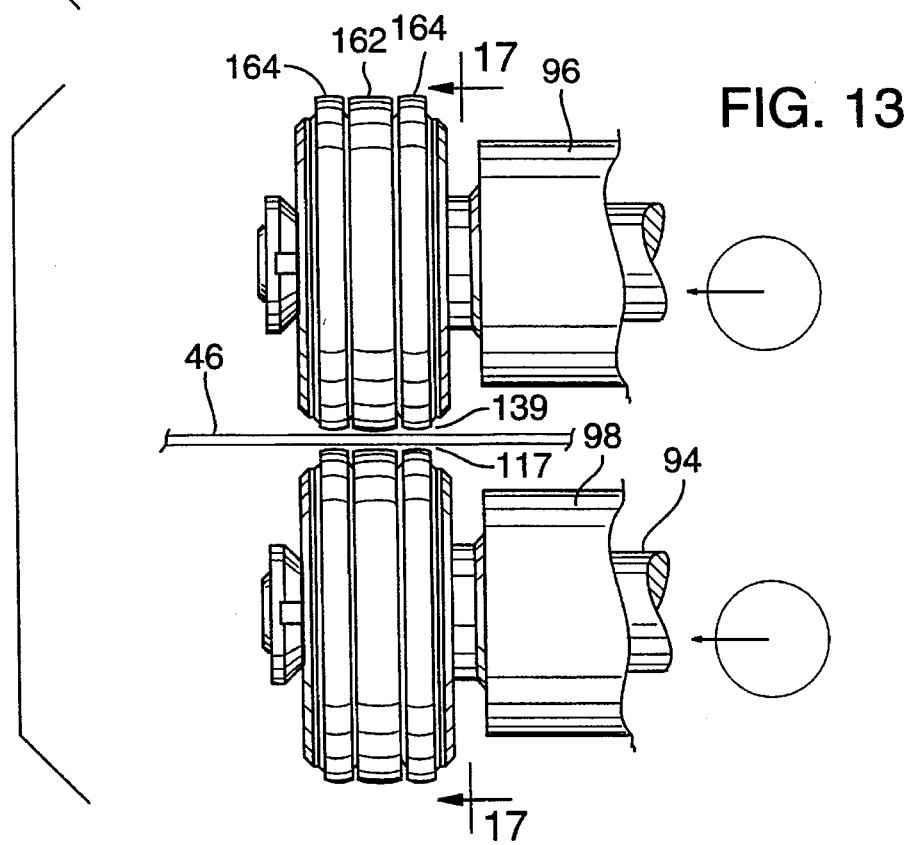
FIG. 13 is a view similar to FIG. 12 illustrating the upper and lower shafts of the set of rollers in their operating or working position, the rollers mounted thereon being adjacent the surfaces of the saw blade and in the zero or neutral position.

Adjustment bracket 130 is also formed in a generally "L"-shaped configuration such that it can support an upper pneumatic cylinder 140 having a piston 142 and piston rod 144. Upper cylinder 140 serves two main purposes: when the lower end is pressurized at 146 and the upper end is exhausted at 148, upper rollers 88 are raised for saw change access. See FIG. 12. When the upper end 148 is pressurized and the lower end 146 is exhausted, piston rod 144 is extended to its full length, as shown in FIGS. 5 and 13. In this position, the small clearance 139 is achieved between upper rollers 88 and saw blade 46. Thus, when both cylinders 106 and 140 are fully pressurized, such that their respective piston rods 112 and 144 are fully extended, the same small clearances 139 and 117 occur between the upper and lower sets of rollers 88, 90 and the upper and lower surfaces of saw blade 46, respectively. See FIGS. 3, 5, 11 and 13.

Straightening and Tensioning Rollers

The design and function of the upper and lower sets of rollers 88, 90 are a principal feature of my invention. Referring particularly to FIG. 6, each of upper and lower shafts 92, 94 (FIG. 6 illustrates upper shaft 92 and its rollers 88 only, lower shaft 94 and its rollers 90 being the same) is attached at its outer end to a double eccentric cam hub 150 by a key 152, spacer 154, and nut 156, as shown. Each hub 150 includes a circular center portion 158 whose center line 159 is horizontally offset or eccentric with respect to axes 66, 68 of shafts 92, 94. Each hub 150 also includes a pair of circular side portions 160 that are disposed on opposite sides of center portion 158 and whose center lines 161 are horizontally offset or eccentric with respect to axes 66, 68, but in a direction opposite to that of center portion 158.

Upper and lower roller sets 88, 90 each comprise three pressing rollers, all having the same outer diameter, a center roller 162 mounted on hub center portion 158, and two side rollers 164 mounted on side portions 160, all of which rollers rotate on bearings 166, being retained on hub 150 by a shaft nut 168, as shown. FIG. 6, a horizontal section, illustrates hub 150 and rollers 162, 164 in their neutral or zero position, whereby the rollers appear as shown in FIGS. 2, 3, 5, 9, 11, 12 and 13, that is, with the aforementioned small clearances 139, 117 between them and the upper and lower surfaces of saw blade 46. Bearings 166 may desirably comprise an SKF 6011 for center portion 158, and an SKF 6009 for side portions 160.

As will hereinafter be more fully explained, upper and lower shafts 92, 94 are adapted to be rotated selectively ninety degrees clockwise and counterclockwise from their zero position through couplings 169 by pneumatic rotary actuators 170. When actuators 170 rotate a shaft ninety degrees, depending upon the direction, either the center roller 162 or the two side rollers 164 will protrude such as to have positive contact with saw blade 46. (Clockwise and counterclockwise herein refer to the rotation of shafts 92, 94 as viewed from the ends to which actuators 170 are coupled.)

Figure 19:
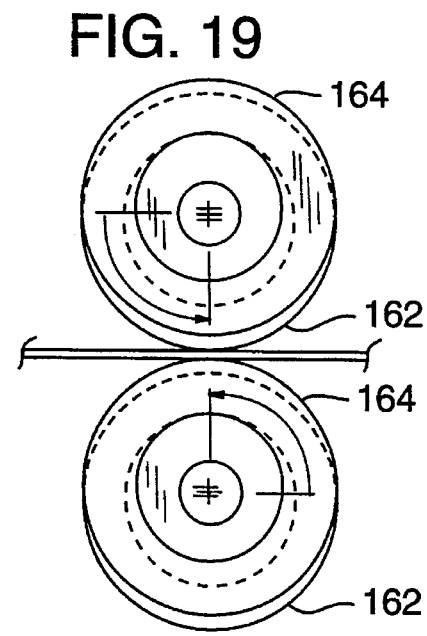
FIG. 19 is a view taken on line 19—19 of FIG. 15.
Figure 20:
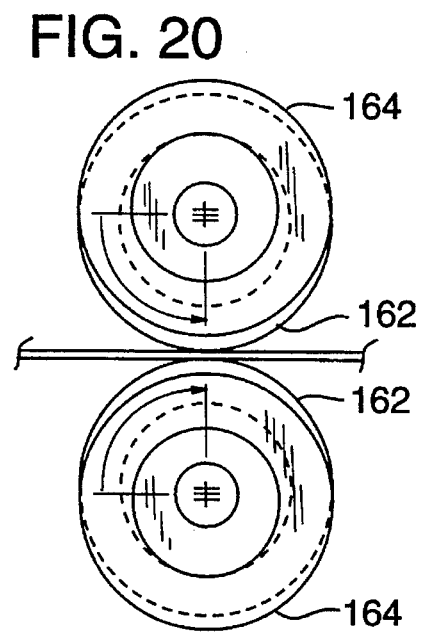
FIG. 20 is a view taken on line 20—20 of FIG. 16.

As an example of its leveling operation, if sensor 72 detects an upward protrusion in saw blade 46, as the saw blade passes roller set 62, upper and lower roller sets 88, 90 are actuated by their respective actuators 170 to rotate shafts 92, 94 counterclockwise such that center roller 162 of upper set 88 is forced downwardly a distance exceeding clearance 139 and, simultaneously, side rollers 164 of lower set 90 are forced upwardly a distance exceeding clearance 117, thereby causing a downward bending pressure on the upward protrusion. See FIGS. 15 and 19. If, however, sensor 72 detects a dent or a downward deformation in the upper surface of saw blade 46, actuators 170 rotate shafts 92, 94 in the opposite direction, that is, clockwise, resulting in an upward bending action. See FIGS. 14 and 18. If an adjustment to plate tension is needed, actuators 170 rotate upper shaft 92 counterclockwise and lower shaft 94 clockwise, such as to cause both center rollers 162 to exert pressure on saw blade 46, thereby causing the metal to be compressed. See FIGS. 16 and 20.

Actuators

Actuators 170 are schematically illustrated in FIG. 7. An actuator suitable for use with this invention is a three-position actuator manufactured by Schrader Bellows®, Rotary Actuator Division, 135 Quadral Drive, Wadsworth, Ohio 44281, whose published catalog material is herein incorporated by reference. Such an actuator includes four ports 171, 172, 173, 174, as shown, and further includes an upper rack 176 and a lower rack 178. Racks 176, 178 are actuated by pistons 181, 182, 183, 184 to rotate a pinion 186 clockwise or counterclockwise, as indicated by arrows 188, 190. A solenoid (not shown) connects ports 171, 172, 173,174 to a source of pneumatic pressure.

Figure 17:
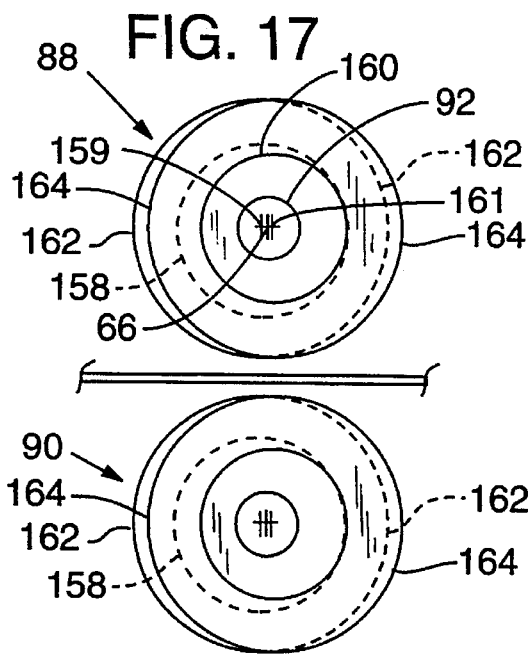
FIG. 17 is a view taken on line 17—17 of FIG. 13.
Figure 18:
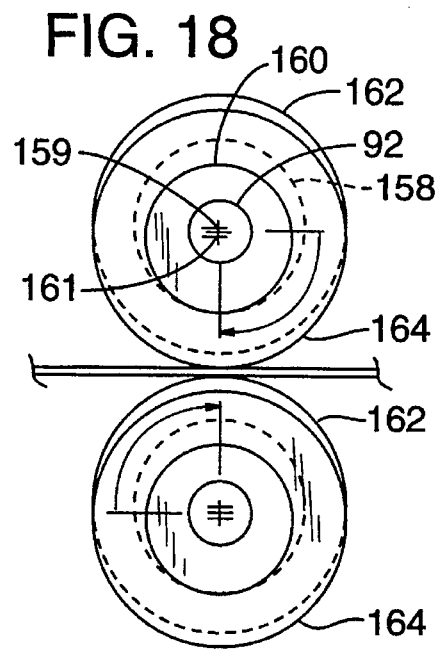
FIG. 18 is a view taken on line 18—18 of FIG. 14.

Pressurizing actuator ports 171, 173 with ports 172, 174 connected to exhaust, causes clockwise pinion rotation such that upper and lower shafts 92, 94 achieve the positions illustrated in FIGS. 14 and 18. Alternately, energizing the solenoid oppositely pressurizes actuator ports 172, 174 with ports 171, 173 exhausted, thereby causing counterclockwise pinion rotation such that upper and lower shafts 92, 94 achieve the positions illustrated in FIGS. 15 and 19. The neutral or zero position is illustrated in FIGS. 13 and 17.

Scanner Carriage Assembly

Scanner carriage assembly 70 (the "second carriage") and sensor 72 are fully illustrated in FIGS. 1, 2, 3, 9, 10 and 11.

Scanner carriage assembly 70 comprises a scanner carriage 192 having a base plate 193 and is mounted on a base 194 comprising a pair of rails 196, themselves mounted in end brackets 198 attached to frame plate 44 by bolts 200. Rails 196 constitute a track, which makes an angle of ninety degrees with respect to the axes 66, 68 of roller set 62. Inasmuch as saw blade 46 rotates clockwise, orienting the scanner carriage track in advance and at ninety degrees with respect to the direction of motion of the scanner carriage assembly 70, achieves a ninety degree programmable time lapse from the time a deformation is detected by sensor 72 until the two sets of rollers 64 react.

A bent arm 202 is attached to the upper part of carriage 192 by brackets 204 and bolts 206. See FIG. 11. Sensor 72 is attached to arm 202 such that it can travel along a radial path ninety degrees in advance of the path traveled by scanner carriage assembly 70.

A second arm 208 is also attached to scanner carriage 192 by a bracket 210 and bolts 212. Arm 208 is positioned immediately below arm 202 and is adapted with post 218 to support saw blade 46 when the saw is thin enough to require it. Specifically, an extension arm 214 is attached to the end of arm 208 by a bolt 216 and carries a vertically oriented post 218 whose position is adjustable with respect to extension 214 by lock nuts 220. See FIG. 11.

Figure 10:
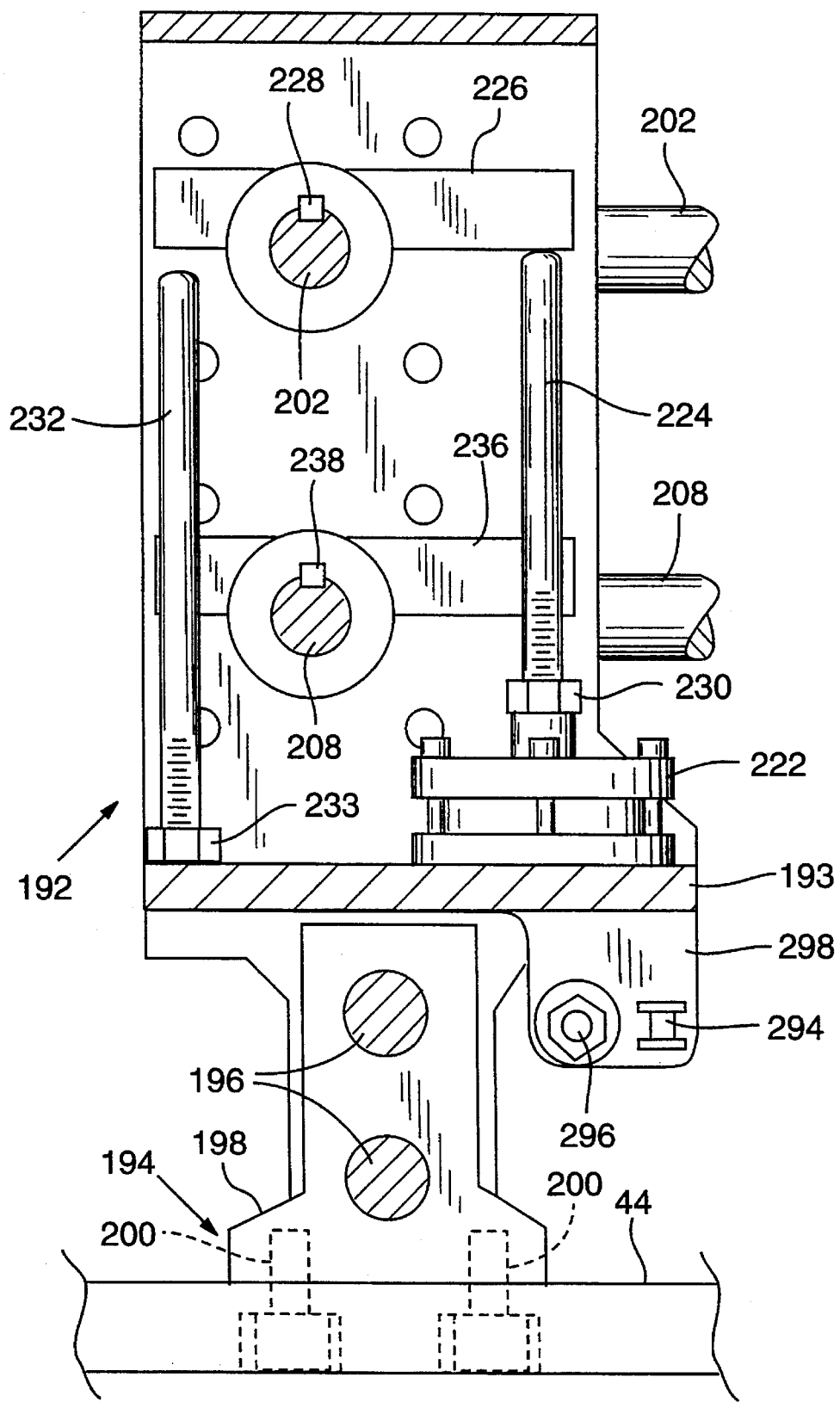
FIG. 10 is a sectional view taken on line 10—10 of FIG. 9.

Sensor 72 and post 218 can both be raised and lowered with respect to the position of saw blade 46 as required for loading, operating, etc. A pneumatic cylinder 222 (FIG. 10) attached to base plate 193 has a rod extension 224 that contacts a rocker arm 226, which is attached to arm 202 by a key 228 such that arm 226 can rotate arm 202 to raise sensor 72, as required. See FIG. 11. A limit rod 232 is also attached to base plate 193 and is held in adjustable position by a nut 233. Limit rod 232 is provided to restrict the rotation of rocker arm 226 and thus, to restrict the amount of upward travel of sensor arm 202 and sensor 72. When rocker arm 226 is level, as shown in FIG. 10, cylinder 222 is in its retracted position, rod extension 224 is in its adjusted position to contact rocker arm 226 to float sensor 72 on the top of saw blade 46, and limit rod 232 is also in its adjusted position, to limit the travel of rocker arm 226 to facilitate saw replacement.

Figure 2:
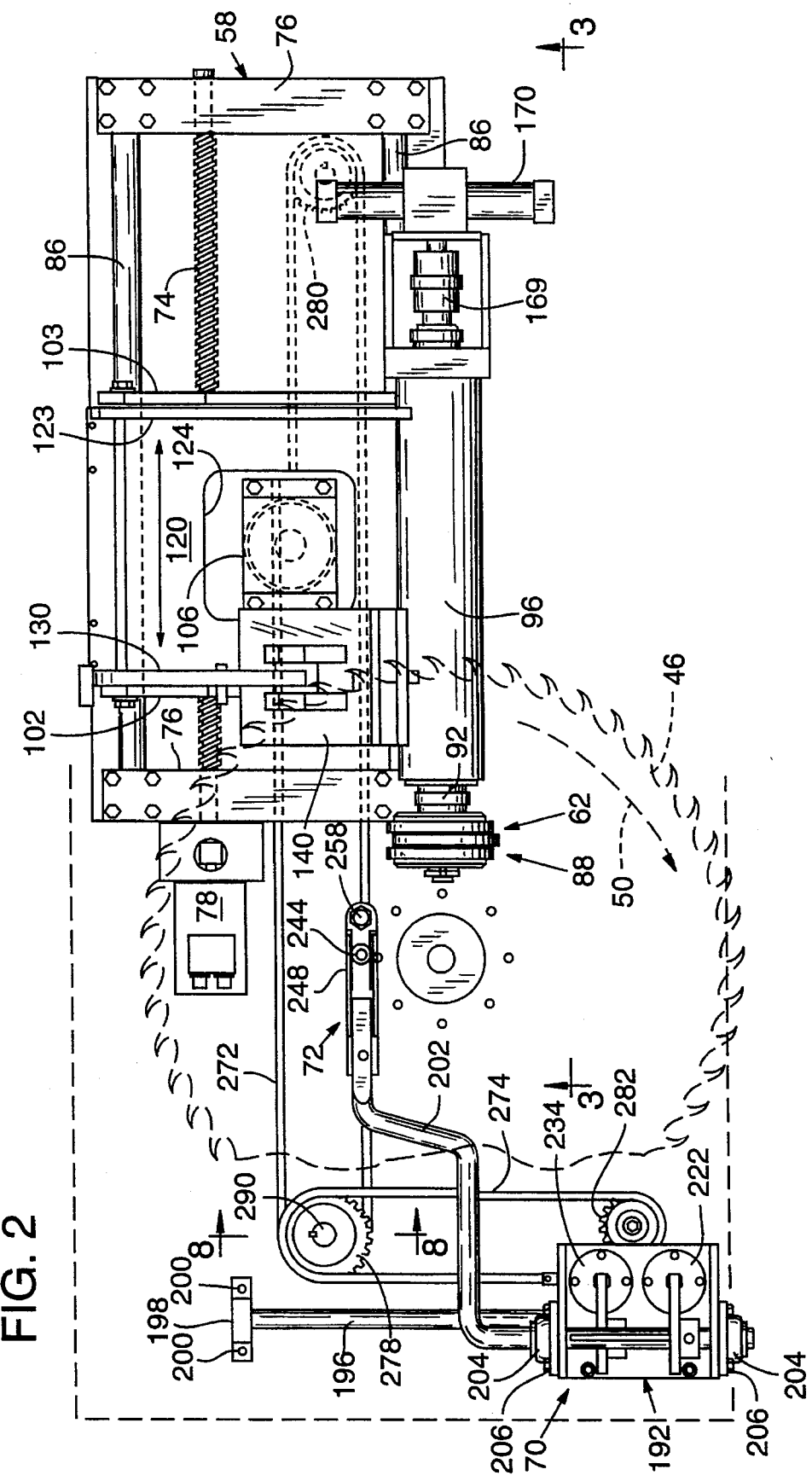
FIG. 2 is a plan view of the machine in operative condition.
Figure 9:
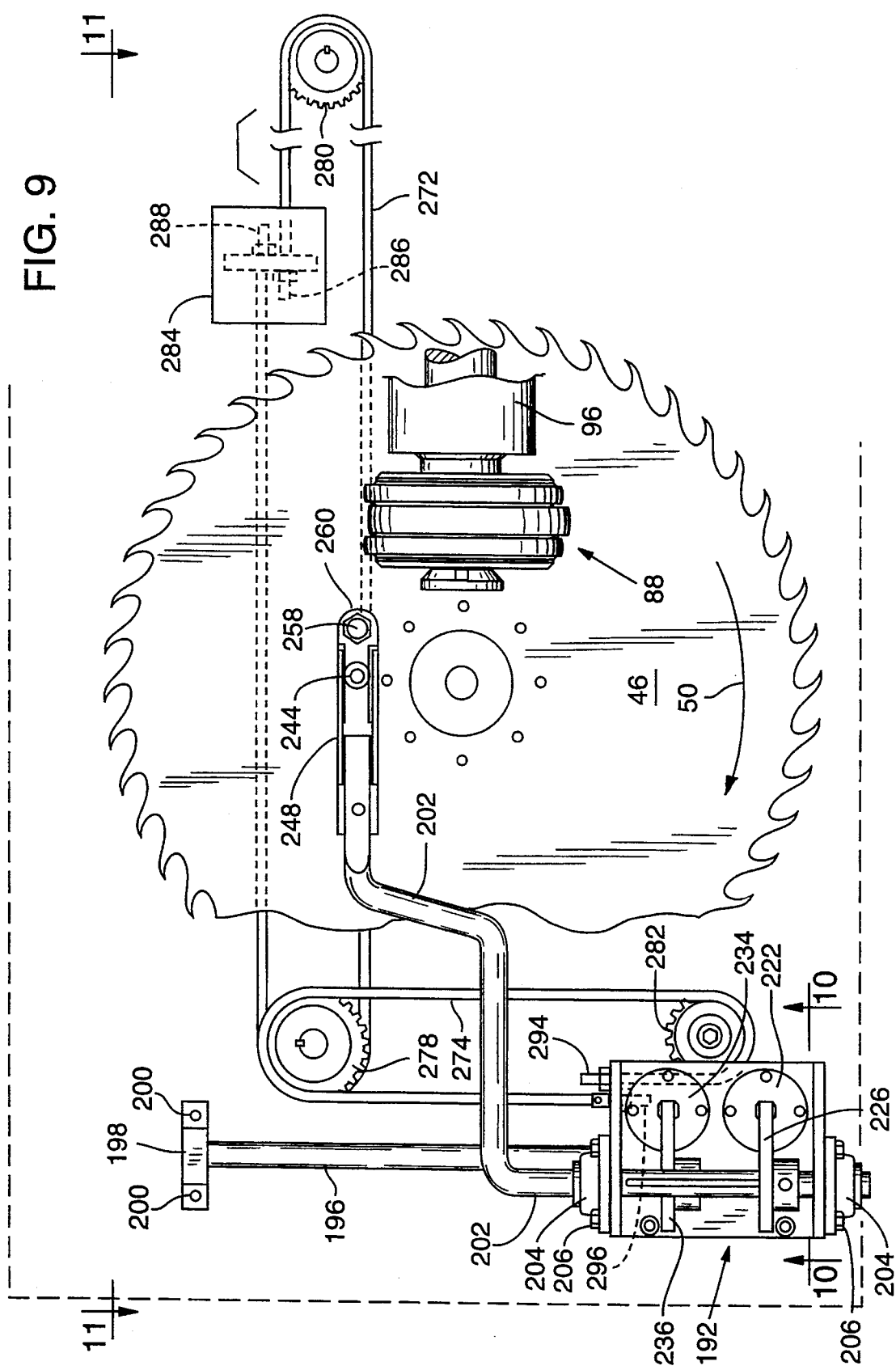
FIG. 9 is an enlarged plan view of a portion of the machine as shown in FIGS. 2 and 4.

Raising and lowering arm 208 and post 218 is accomplished in a similar manner. Referring to FIGS. 2, 9 and 10, a cylinder 234, a rod extension and a limit rod (neither of the latter being shown) are provided similar to cylinder 222, rod extension 224 and limit rod 232, respectively, except that they act on a rocker arm 236, which is attached to arm 208 by a key 238, as shown. The rod extension and limit rod for rocker arm 236 are, of course, shorter than rod extension 224 and limit rod 232. Also, it should be noted that the working position of arm 208 is when it is in its raised position (see FIG. 11), whereas arm 202 supporting sensor 72 is in its operating position when it is in its lowered position.

Sensor

Figure 24:
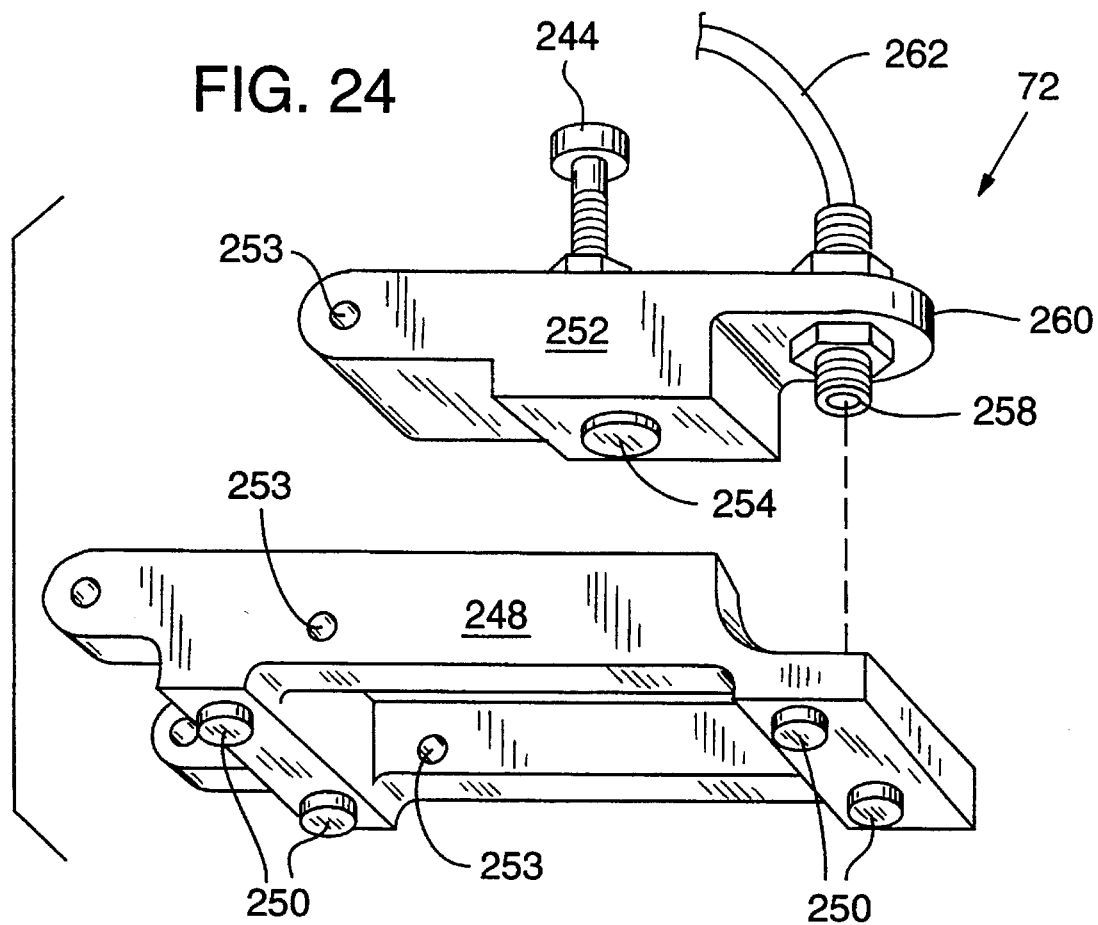
FIG. 24 is an exploded perspective view of the sensor.
Figure 25:
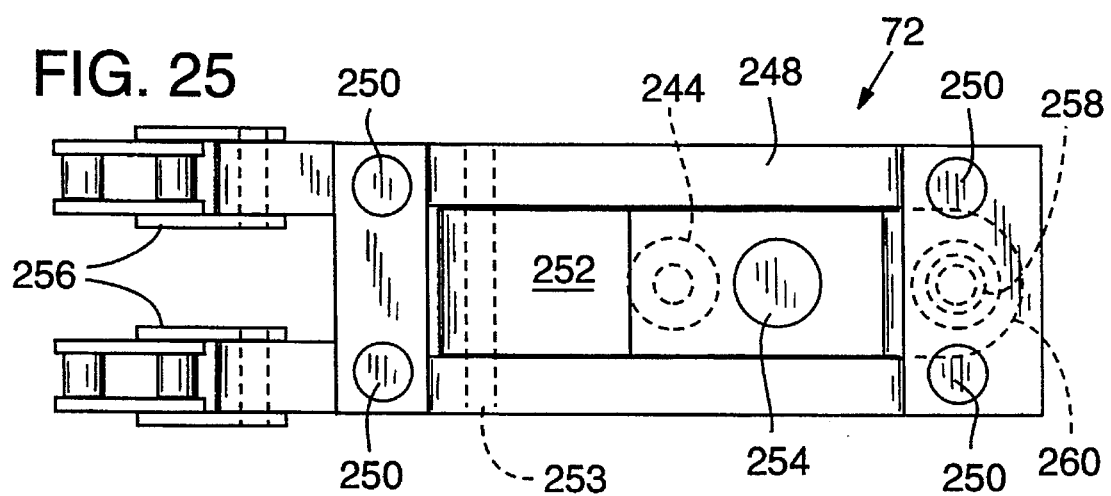
FIG. 25 is a bottom view of the sensor.
Figure 26:
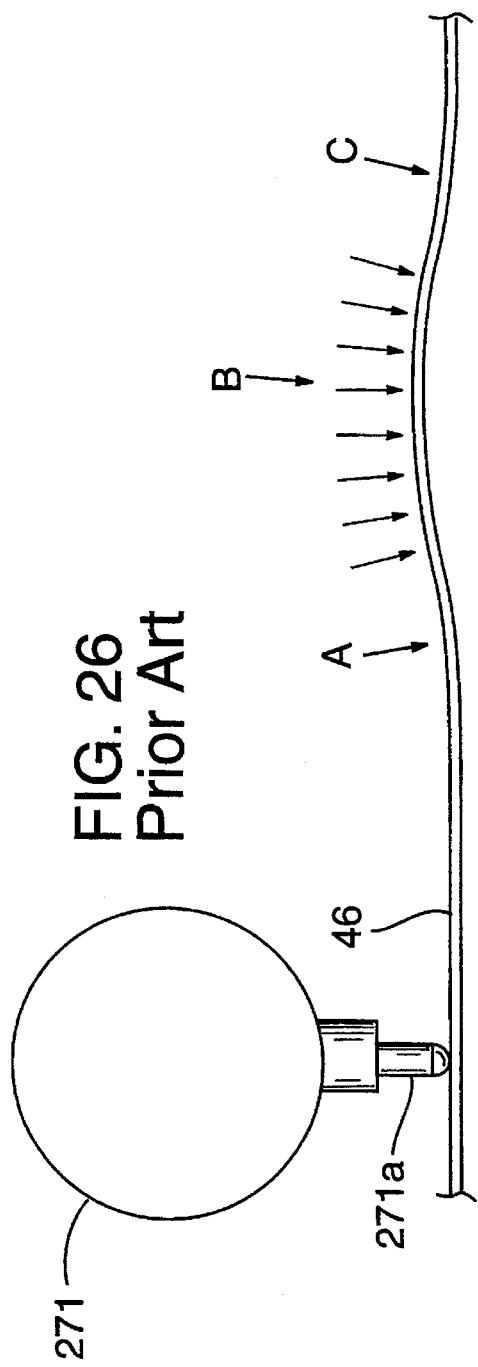
FIG. 26 is a schematic view illustrating a prior art single contact-point sensor operating with a fixed reference from a beam as it attempts to detect a bulge in an upper surface of a saw blade resulting from two concave deformations which cause a convex deformation therebetween.

The design and function of sensor 72 is another principal feature of my invention. Sensor 72 is best illustrated in FIGS. 24 and 25, although it is also illustrated in FIGS. 1, 2, 3, 9 and 11. Its operation is illustrated in FIGS. 21, 22, 23 and 27. A prior art sensor is illustrated in FIG. 26.

Figure 3:
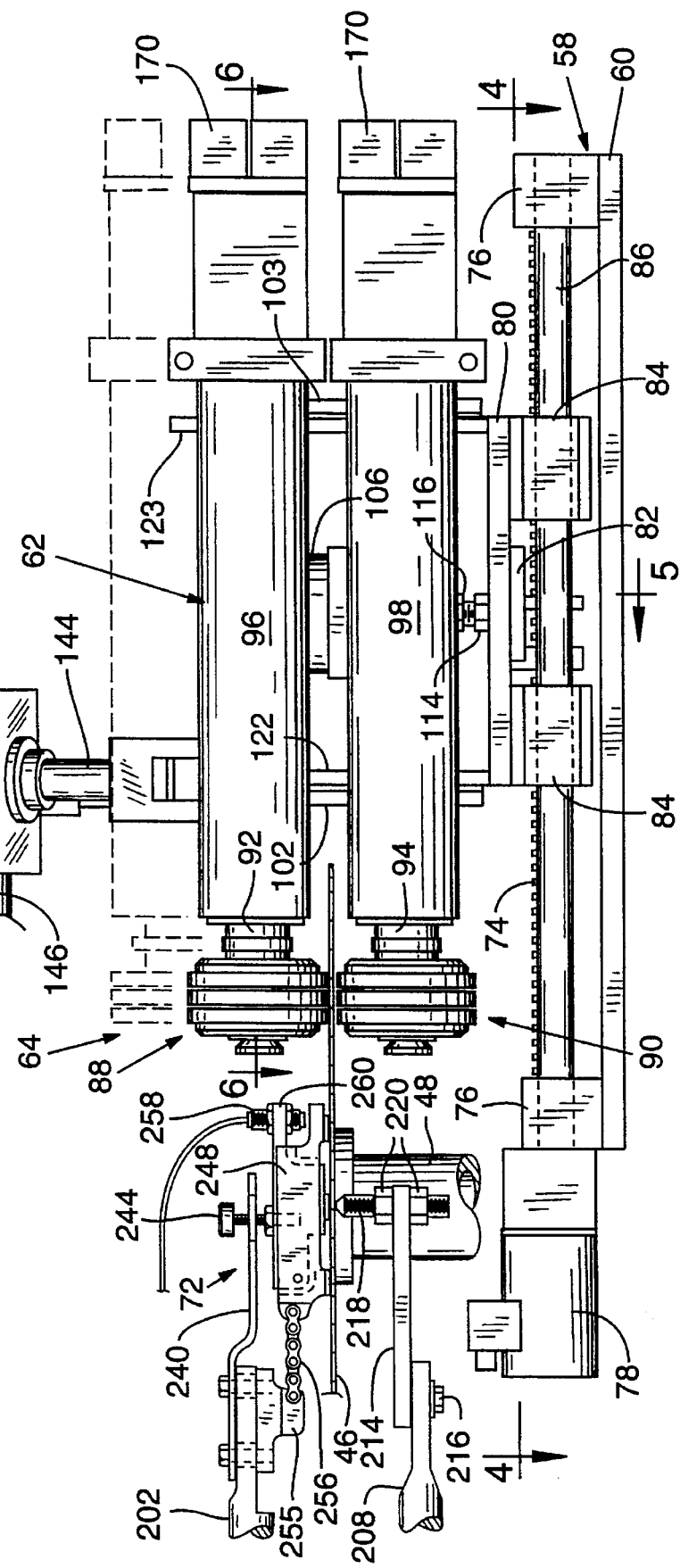
FIG. 3 is an elevational view taken on line 3—3 of FIG. 2, illustrating in phantom lines the raised position of the upper set of rollers.
Figure 11:
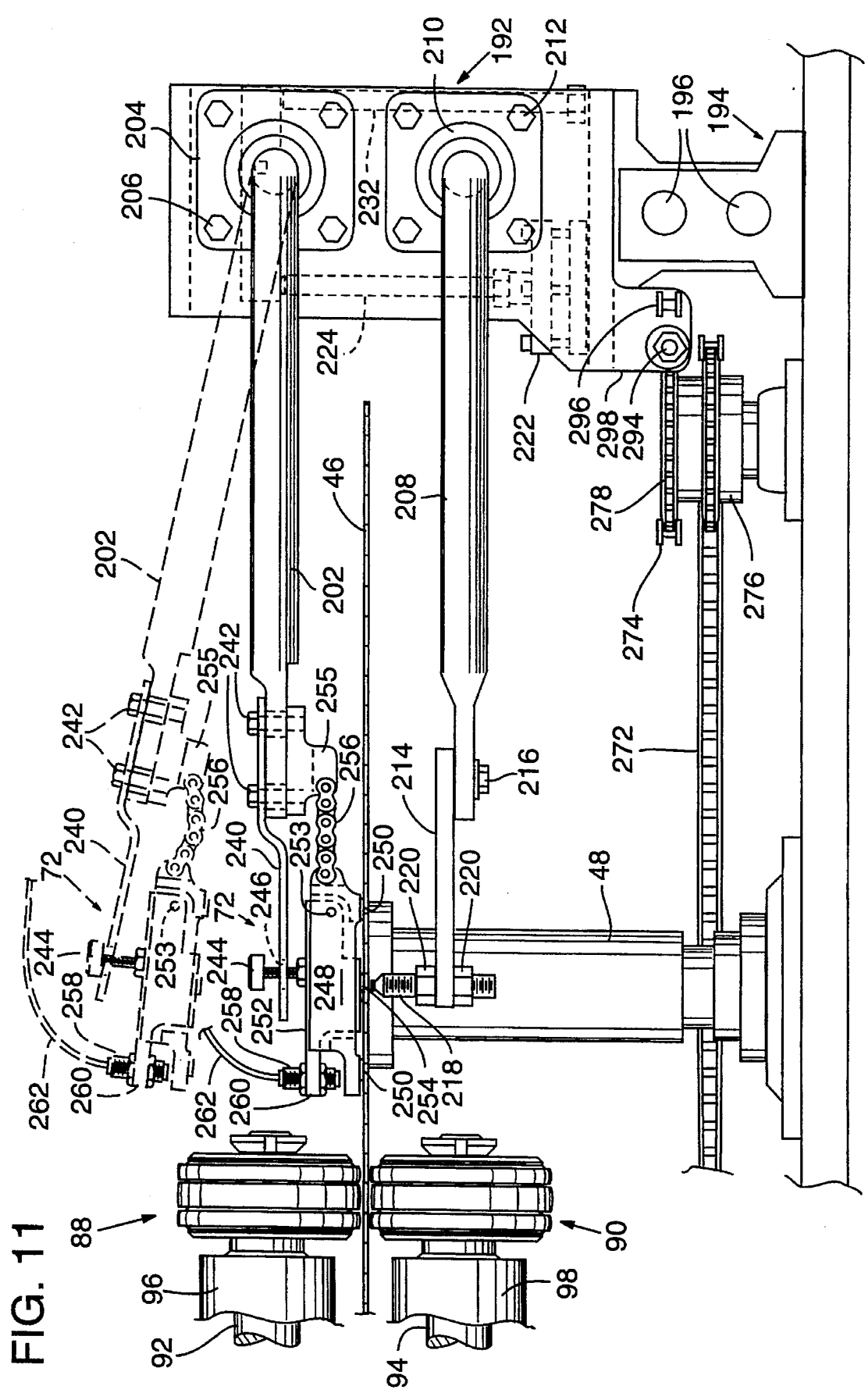
FIG. 11 is an elevational view taken on line 11—11 of FIG. 9 illustrating the sensor in its working position and further illustrating, in phantom, the sensor in a raised position for installing saws.

As shown in FIGS. 3 and 11, an extension 240 is attached to the end of arm 202 by bolts 242, sensor 72 being slidably retained in extension 240 by a screw 244, which passes through a clearance hole 246. Hole 246 allows sensor 72 to have total freedom to float while in contact with saw blade 46; however, screw 244 permits sensor 72 to be lifted from saw blade 46 by arm 202 and extension 240 when required. See the phantom line position of sensor 72 in FIG. 11.

Sensor 72 itself comprises a body or frame 248 (see FIG. 24), which is preferably rectangular in shape, and has four flat, fixed, foot supports 250 for sliding along the upper surface of saw blade 46. The contact surfaces of supports 250 define a perfectly flat plane. A rotatable arm 252 is pivotally mounted at pivot points 253 in frame 248 and carries a fifth flat foot 254. Foot 254 contacts the upper surface of saw blade 46 intermediate supports 250 and along a radius of saw blade 46. By this means foot 254 can measure any deviation from the flat plane defined by the positions of supports 250 as saw blade 46 rotates beneath sensor 72. Supports 250 and foot 254 are provided with carbide wear surfaces where they contact saw blade 46.

As shown in FIGS. 3, 11, 24 and 25, frame 248 is also attached to depending flanges 255 of arm 202 by a pair of chains 256, one being attached to each side of frame 248. See FIG. 25. Chains 256 accurately move sensor 72 radially along saw blade 46 when sensor 72 is in its down or working position, but they hang loosely when arm 202 raises sensor 72, as shown in phantom in FIG. 11.

A sensor gauge or switch 258, which may be a Micro Switch™ No. 924AB3H-L2P, and which includes a transducer, is mounted in an end 260 of pivotal arm 252. As hereinabove mentioned, switch 258 measures upward and downward deviation of movable foot 254 from the plane defined by the four fixed foot supports 250 and generates a signal through wire 262 proportional to such deviation.

Figure 28:
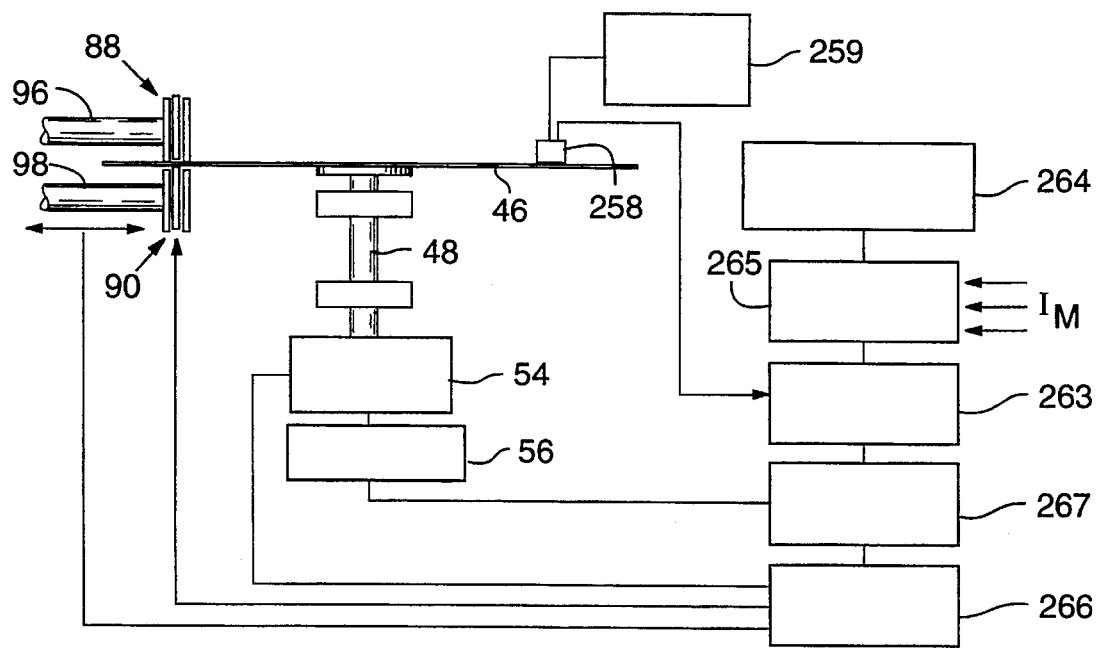
FIG. 28 is a diagram describing the relationship between the major control components of the present invention.

As schematically illustrated in FIG. 28, when switch 258 receiving power from a power supply 259 detects a deviation from the aforementioned flat plane, and which deviation exceeds a predetermined amount, a signal is transmitted to an analog input 263. The signal feeds the information to a programmable logical controller 264, which may be an Allan-Bradley PLC Model SLC 500, although other PLCs and/or computers could be used. Controller 264 is programmed by an input card 265 from manual inputs $I_M$, as shown. Controller 264 signals actuators 170 through an output card 266 to rotate rollers 88, 90 to exert upward or downward pressure on saw blade 46 as required. Encoder 56, which may be an Allan-Bradley Absolute Optical Position encoder, Model No. 845-SJDZ-24-AN-CW5, also provides information to controller 264 through an encoder card 267. Such information relates rotation of saw blade 46, movement of roller carriage 58, and corresponding movement of scanner carriage 70, as will hereinafter be discussed.

As is evident, my sensor does not have to be calibrated for each saw blade thickness, as is necessary with sensors that are referenced from a fixed beam and have a single-point sensor pin. Also, because my supports 250 and movable foot 254 have large carbide wear surfaces, they have a very long life cycle. In contrast, a single-point sensor pin has a very tiny contact, which makes it vulnerable to wear-related errors. Also, sensor 72 is able to recognize a properly tensioned saw blade, even though such may sag at its periphery when lying horizontally and supported only at its eye. My sensor recognizes this as a function of tension, and my rollers react accordingly. On the contrary, a sensor referenced from a fixed beam and having a single-point sensor pin detects such a sagging saw blade as having a very long, downward deformation, thereby to provide erroneous information to deformation-correcting rollers.

Operation of my sensor is illustrated in FIGS. 21, 22, 23 and 27. Referring to FIG. 21, sensor 72 is illustrated in contact with a perfectly flat, circular saw blade 46. Movable foot 254 is, accordingly, positioned within the flat plane defined by the positions of supports 250. Switch 258 measures a gap 268 and references it as normal or zero deformation. Switch 258, accordingly, sends no signal to actuators 170.

FIG. 22 illustrates sensor 72 in contact with saw blade 46 when deformed upwardly. Movable foot 254 is raised with respect to the flat plane defined by the positions of foot supports 250 and, accordingly, rotates arm 252 upwardly about pivot points 253. This results in an enlarged gap 269. Switch 258 then signals actuators 170 to exert downward pressure on saw blade 46. This, of course, occurs after the expiry of the period of time corresponding to the length of the circular path between the point at which sensor 72 detects the increased gap and the point of contact of the sets of rollers 88, 90.

FIG. 23 is a similar view illustrating sensor 72 in contact with a saw blade 46 deformed downwardly. Switch 258 reacts to a reduced gap 270 and transmits a signal to actuators 170 to rotate roller sets 88, 90 to exert upward pressure on saw blade 46 at the expiry of the aforementioned period of time.

As has been mentioned hereinabove, a typical deformation in a saw blade is often a combination of three bends. For example, a bulge in an upper surface of a saw blade is often the result of two concave deformations, which result in a convex deformation between them, when viewed from above. In many such cases, only the concave areas are the actual defective areas, the convex area being the natural result of the concave areas on either side. Such a condition is schematically illustrated in FIG. 26.

FIG. 26 illustrates a prior art sensor 271 referencing from a fixed beam and having a single-point sensor pin 271a. Such a sensor only triggers the leveling process when a deformation exceeds a certain limit. In the FIG. 26 illustration, the actual concave portion of the deformation identified "A" will be undetected, as will the concave portion identified as "C," and sensor 271 will only call for correction in the apparently convex area identified as "B." sensor 271 cannot identify deformations in areas "A" and "C" and calls for rollers to work only area "B," whereas in the FIG. 26 example, such working is actually unneeded.

Figure 27:
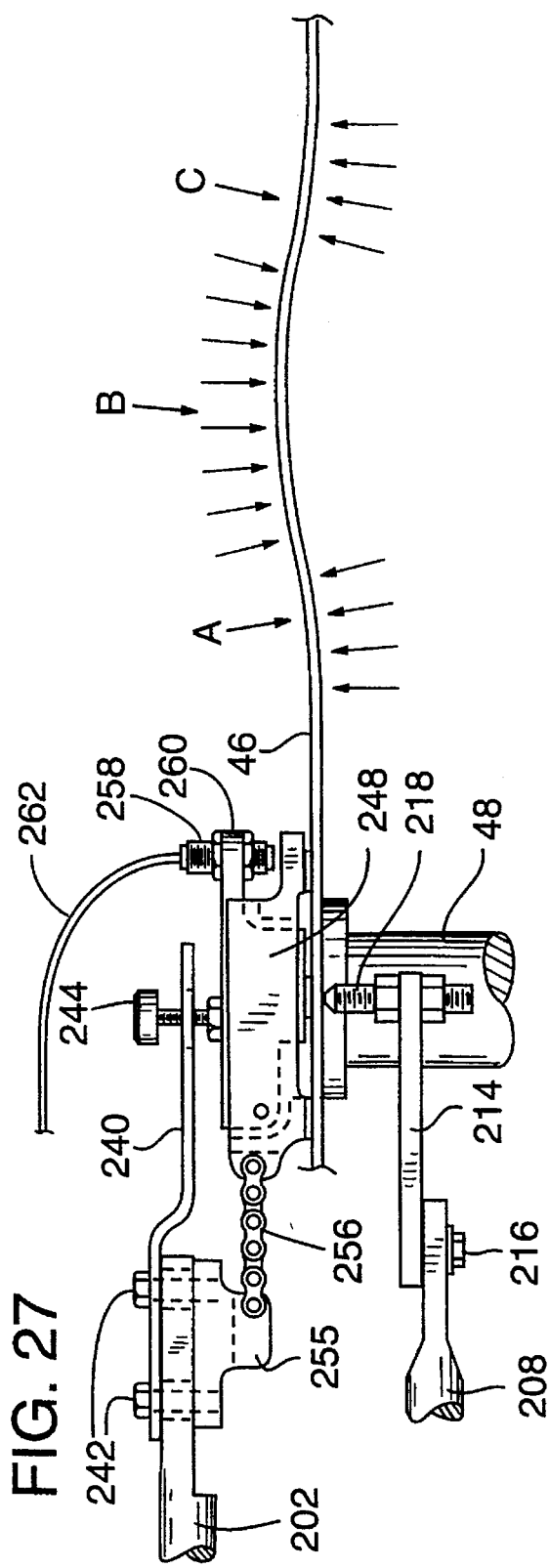
FIG. 27 is a schematic view illustrating the sensor of the present invention operating in an area of a saw blade having the same type of deformation illustrated in FIG. 24.

Referring to FIG. 27, in contradistinction to the ability of single-point sensor 271, sensor 72 of the present invention detects area "A" as concave, area "B" as convex, and area "C" as concave, and then works each of them accordingly.

As previously mentioned, another problem for a single-point sensor is that of plate thickness. A single-point sensor and sensor 72 of the present invention both require a saw blade to be supported from below. However, when a single-point sensor is calibrated, as it must be, for a certain plate thickness, for example, 0.100 inch, and a saw blade of a different thickness is installed, for example, 0.125 inch, the pin 271a will sense the thicker plate as having a continuous 0.025-inch upward deformation. Such, of course, results in a totally erroneous action in leveling the saw.

Roller Carriage-Scanner Carriage Connection

It is axiomatic that the center of movable or pivotable foot 254 and the mid-planes of rollers 162, 164 must always be located on the same circular line of saw blade 46, notwithstanding that the radii on which they act are ninety degrees apart. That is, roller sets 64 and sensor 72 must be displaceable by the same distance toward the center or toward the periphery of saw blade 46 at all times.

Figure 4:
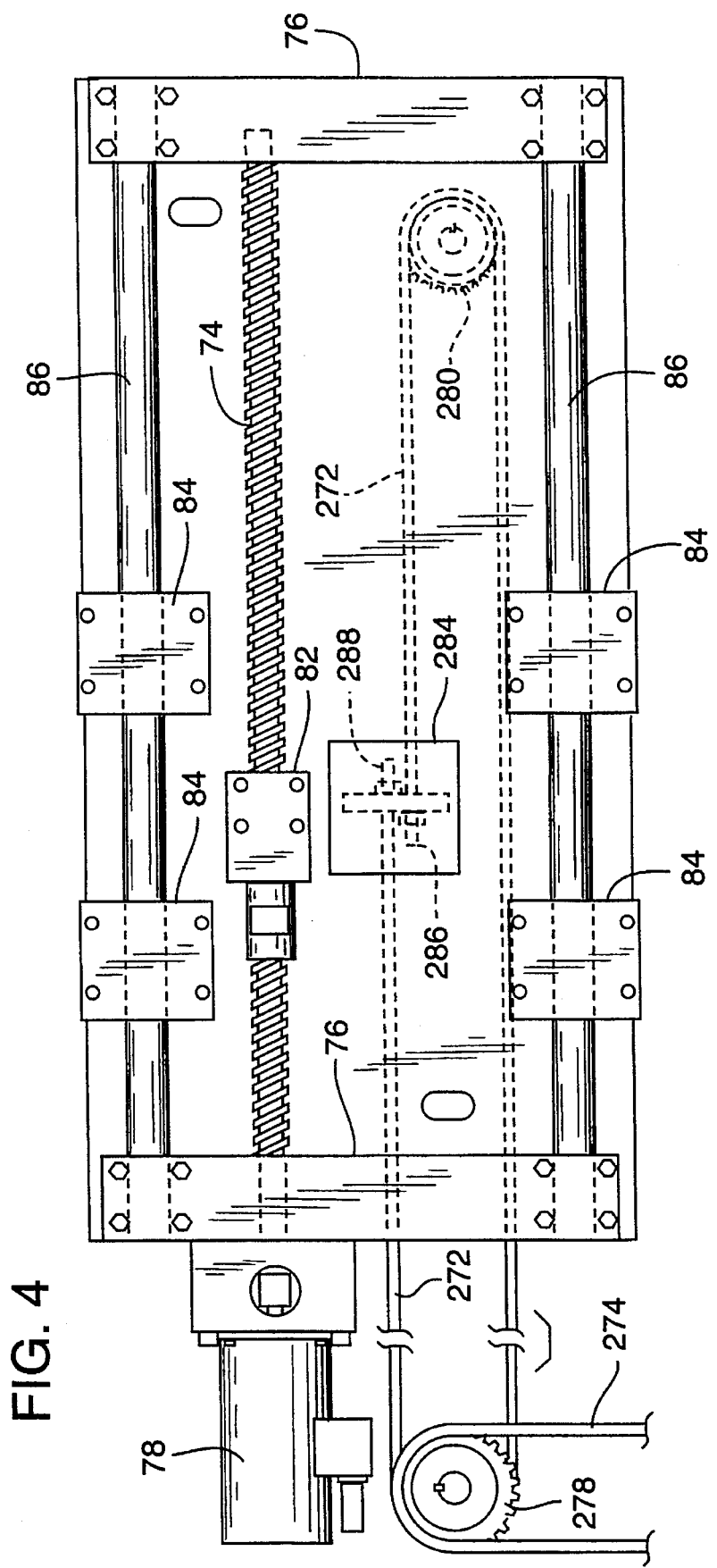
FIG. 4 is a sectional view taken on line 4—4 of FIG. 3.

The means by which I tie roller carriage 58 and scanner carriage 70 together are best illustrated in FIGS. 2, 3, 4, 8, 9 and 11. Specifically, I utilize two sections of roller chain 272, 274, a pair of attached coaxial sprockets 276, 278, and a pair of idler rolls 280, 282. As shown in FIGS. 4 and 5, a bracket 284 is mounted beneath roller carriage plate 80, to which bracket 284 the ends 286, 288 of chain 272 are attached. Chain 272 is entrained around sprocket 276 and idler roll 280. See FIGS. 2, 4, 8 and 9. Chain 274 is entrained around sprocket 278 and idler roll 282. Also see FIGS. 2, 4, 8 and 9. Coaxial sprockets 276, 278 are attached to each other as above mentioned and rotate on a shaft 290 in bearings 292 attached to frame plate 44. See FIG. 8. Thus, movement of roller carriage 58 along threaded spindle 74 by motor 78 causes chain 272, idling on idler 280, to rotate sprocket 276 and attached sprocket 278.

Chain 274 is attached at its ends 294, 296 to a bracket 298 depending from base plate 193 of scanner carriage 70. See FIGS. 9, 10 and 11. Thus, movement of roller carriage 58 by rotation of spindle 74 causes chain 272 to rotate sprocket 276, which causes an identical rotation of sprocket 278. This rotates chain 274 around idler roll 282 to move scanner carriage 70 a distance identically equal to the movement of roller carriage 58. This ensures that movement of threaded spindle 74 will cause rollers 162, 164 and the center of pivotal foot 254 to occupy the identically same radial position on saw blade 46 at all times.

Figure 8:
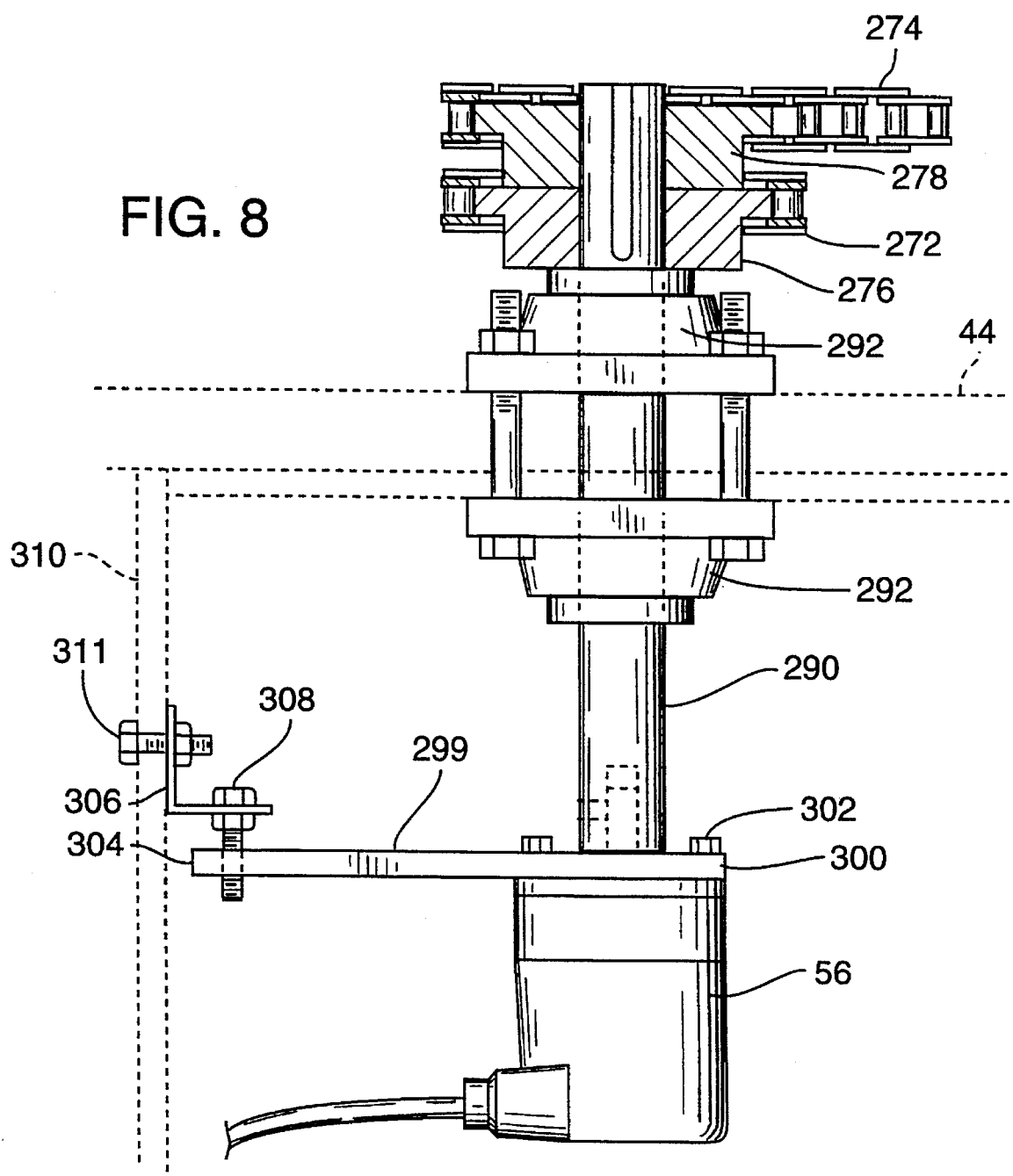
FIG. 8 is a sectional view taken on line 8—8 of FIG. 2.

As shown in FIG. 8, encoder 56 is mounted on the bottom of shaft 290, being rotated by sprockets 276, 278. Shaft 290, with its bearings 292, thus effectively ties sprockets 276, 278 together with encoder 56. A torque arm 299 is attached at one end 300 to encoder 56 by bolts 302 and at its other end 304 to a bracket 306 by a bolt 308. Bracket 306 is, in turn, attached by a bolt 311 to a vertical plate 310 depending from frame plate 44. This prevents the body of encoder 56 from turning while shaft 290 rotates. Encoder 56 tracks the location of rollers 162, 164 and sensor 72 with respect to a radius of saw blade 46 and feeds the data back to controller 264. The data is also used as limits for the total travel of the machine, as well as each saw configuration.

More specifically, encoder 56 outputs electrical pulse signals which controller 264 tracks. Through the tracking of these "pulses", controller 264 learns the exact rotational position of sprockets 276, 278 and shaft 290. Since sprockets 276, 278 and shaft 290 are connected to roller carriage 58 and scanner carriage 70 by roller chains 272, 274, controller 264 knows the exact positions of the carriages at all times. Such positioning information is used for a number of different purposes which are all controllable by controller 264. Examples of such purposes are to determine inner and outer travel limits of carriages 58 and 70; to trigger the beginning point at which to commence leveling and tensioning; and to read the advance distance and speed of each consecutive rolling pass.

As is evident, the required beginning point and ending point will vary from one saw diameter to another. One of the manual inputs (see FIG. 28) is a selector switch (not shown) which the operator sets to match the particular saw to be worked. Such selection sets all the applicable parameters for controller 264 as programmed for the particular saw blade.

Using information from the selector switch, controller 264 establishes the various pneumatic pressures for cylinder 140. Such information is sent from controller 264 to a MAC® proportional control valve (not shown). Controller 264 first reads the position from the selector switch that identifies the saw. That information is then combined with the programmed data for the pneumatic pressure settings for cylinder 140. Using the data from encoder 56 and the deformation information from sensor 258, controller 264 signals the proportional control valve to set the pressure in cylinder 140 as required for the stepwise operation to remove unevenness in the saw blade as will be hereinafter explained.

Stepwise Operation

Figure 29:
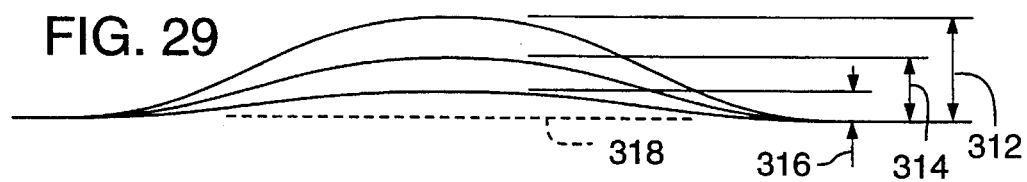
FIG. 29 is a schematic representation of a deformation in a saw blade that is to be corrected in a series of steps.
Figure 30:
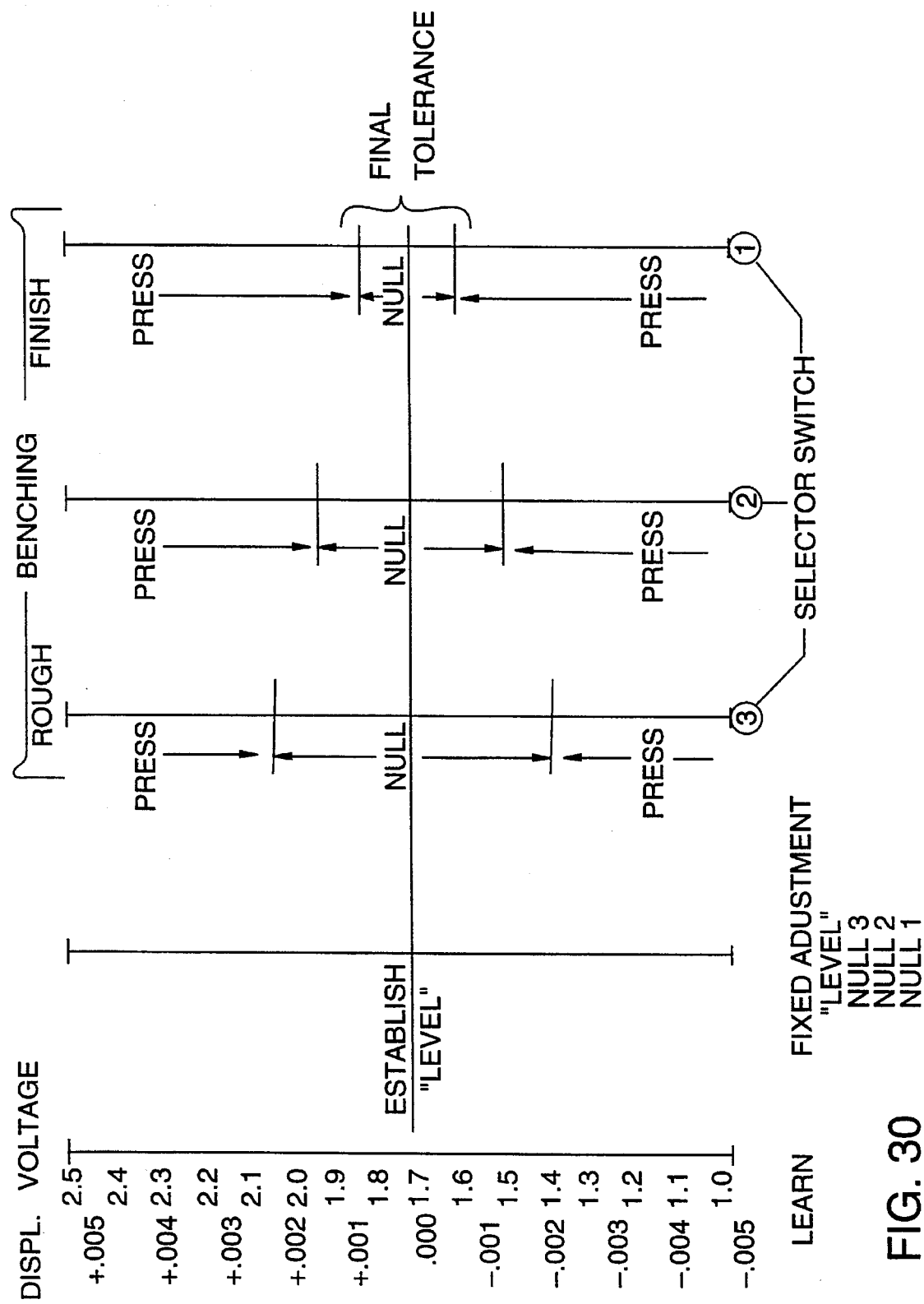
FIG. 30 is a diagram illustrating the stepwise correction of deformations in the surface of a saw blade deformed as in FIG. 29.

Elimination of deformations or unevenness in a saw blade 46 is typically achieved by my machine in a series of steps, generally three steps. FIG. 29 illustrates, schematically and greatly exaggerated, a deformation like that illustrated in FIGS. 26 and 27, and which is reduced in a series of three steps, or stages. FIG. 30 is a diagram illustrating how correction is achieved in each of the three steps, or stages.

I first note that there is a relationship between the displacement (depth or height of a defect) and the voltage V put out by sensor 72. This is set forth in the left-hand column of FIG. 30. It is also necessary to establish the voltage generated by a perfectly flat, level saw. The calibration that establishes this level is the basis for the entire leveling operation. It varies from machine to machine and is dependent upon the installed position of sensor 72 at assembly. FIG. 30 illustrates the value of that voltage by the horizontal line L.

As illustrated in FIG. 30, stepwise correction of deformations is achieved in a series of three passes. These are controlled by selector switches $S_1$, $S_2$, and $S_3$, as shown. In the first of such steps, "Rough" leveling R, controller 264 ignores all voltages within a programmable, relatively wide range from the calibration point illustrated by the "fixed adjustment" or the voltage established for a perfectly flat, level saw. That range is the "Null" range or window $N_R$ shown in the "Rough" line R in FIG. 30. Only voltages above the "Null" window $N_R$ cause controller 264 to fire rollers 162, 164 to press an upwardly extending deformation down. This is shown by the symbol $P_{DR}$. If the voltage falls below the "Null" window $N_R$, controller 264 fires rollers 162, 164 to press a downwardly extending deformation up. This is shown by the symbol $P_{UR}$. In the "Rough" step R, controller 264 is programmed to fire or provide the highest, preestablished air pressure in upper pneumatic cylinder 140. See FIG. 5. Such pressure establishes the maximum force that arm 122 can exert on rollers 64. While in this "Rough" mode R, all lesser displacement defects, i.e., those within the "Null" window $N_R$, are ignored.

When the "Rough" cycle R is completed, the leveling proceeds to the mid-cycle shown in the middle line M in FIG. 30. The "Null" window $N_M$ is reduced, whereby the machine works defects of lesser magnitude. For this step, controller 264 is programmed to provide a lesser predetermined pressure in upper cylinder 140.

When the mid-cycle is completed, the leveling proceeds to the "Finish" leveling step F shown at the right of FIG. 30. The "Null" window $N_F$ is reduced even further. Pneumatic pressure in cylinder 140 is reduced again, and the deformation is reduced to its final tolerance $T_F$.

It should be noted that the cycles referred to hereinabove are completely controllable by the controller 264. I have found that the application of working pressure by means of rollers 162, 164 in three steps generally achieves desired saw blade surface quality and within a reasonable time.

Consider now a deformation of the type shown in FIGS. 26, 27 and 29, wherein concave areas "A" and "C" create a convexed area "B," as shown. If sensor 72 detects a concave defect, whether it be a defect "A" or "C" leading into a convex defect "B," or the center or main portion of a low dent (area "B" in a diagram like FIGS. 26, 27 or 29 but drawn upside down), sensor 72 first reads the voltage, which is a function of the amount of displacement. See left-hand column R of FIG. 30. In the first cycle, which is the "Rough" benching, controller 264 provides the previously described predetermined high pressure to upper cylinder 140 (FIG. 5), which pressure stays constant during the entire roughing cycle. If the voltage shown in the left-hand column of FIG. 30 drops to less than the preprogrammed "Null" limit for the "Rough" cycle, controller 264 fires rotary actuators 170 to cause upper side rollers 164 and lower center roller 162 to contact saw blade 46 with a bending force limited by the pressure in cylinder 140. Saw blade 46, of course, is rotating, and at the end of each revolution, controller 264 causes rollers 64 and sensor 72 progressively to index to a new radial position on saw blade 46. This continues until the entire surface of saw blade 46 is covered. The "Rough" cycle is then completed, and controller 264 starts the next cycle.

If during the next cycle sensor 72 again detects a concave defect, again whether it be a defect "A" or "C" leading into a convex defect "B," the center or main portion of a low dent (area "B" in a diagram like FIGS. 26, 27 or 29 but drawn upside down), sensor 72 again reads its voltage, which indicates its displacement. In this second cycle, which is the aforementioned mid-cycle or "Medium" benching, controller 264 provides the aforementioned medium predetermined air pressure to cylinder 140, again maintaining this medium pressure during the entire "Medium" or mid-cycle. If the voltage from sensor 72 drops to less than the preprogrammed "Null" limit in this mid- or "Medium" cycle, actuators 170 are fired to cause upper side rollers 164 and lower center roller 162 to contact saw blade 46 with a bending force, again limited by the pressure in cylinder 140. Saw blade 46 is continually rotating, and at the end of each revolution, rollers 64 and sensor 72 are progressively indexed to the next radial position on saw blade 46. After the entire surface of saw blade 46 is covered, controller 264 starts the third and final cycle.

The operation of my machine for the third or "Finish" cycle is exactly the same as for the previous two cycles, except that the "Null" limit is narrower, representing the final tolerance as shown, and the air pressure in cylinder 140 is lower such as to obtain a considerably lessened roller pressure.

Where a dent occurs in the opposite direction, that is, a convex defect, whether it be a convex area leading into a low dent (imagine FIGS. 26, 27 or 29 drawn upside down), or the center or main portion of a high dent, sensor 72 again reads its voltage, which is above the established "Level" voltage (shown in FIG. 30), and which is a function of the amount of displacement. In the first cycle, again the "Rough" benching cycle, controller 264 provides air to cylinder 140 at the predetermined high pressure. The pressure remains at this level during the entire roughing cycle. If the voltage from sensor 72 increases to more than the preprogrammed "Null" limit, actuators 170 are fired to cause the lower side rollers 164 and the upper center roller 162 to contact saw blade 46 with a bending force limited by the pressure in cylinder 140. Saw blade 46 is rotating, and at the end of each revolution, rollers 64 and sensor 72 progressively index to a new radial position on saw blade 46. When the "Rough" cycle is completed, controller 264 starts the next cycle.

If during this next cycle a convex defect is detected by sensor 72, whether it be leading into a low dent or is itself the main portion of a bulge or high dent, sensor 72 reads its voltage, which is an indication of displacement. In this second cycle, which is the "Medium" benching, controller 264 provides air pressure to cylinder 140 at the predetermined medium pressure, which remains at this level during the entire "Medium" cycle. If the voltage from sensor 72 increases to more than the preprogrammed "Null" limit in this "Medium" or mid-cycle, actuators 170 are fired to cause lower side rollers 164 and upper center roller 162 to contact saw blade 46 with a bending force limited by the pressure in cylinder 140. Saw blade 46 is continually rotating, and at the end of each revolution, rollers 64 and sensor 72 progressively index to the next radial position on saw blade 46. At the completion of this cycle, controller 264 starts the next, final or "Finish" cycle.

The "Finish" cycle is exactly the same as the "Rough" and "Medium" cycles, except that the "Null" level is narrower, representing the final tolerance as shown, and the pressure in cylinder 140 is lower, achieving the lesser roller pressure.

As described, my machine achieves these cycles in steps, first "Rough" and then progressively working to the "Finish" benching cycle. A deformation having a total amplitude 312 as shown in FIG. 29 is reduced in the "Rough" cycle to amplitude 314, then by the "Medium" or mid-cycle to an amplitude 316, and finally, by the "Finish" cycle to the final tolerance, represented by the dotted line 318. Roller action, that is, firing to push a dent or concave area up or push a bulge or convex area down, is done on demand, as called for by sensor 72. The action occurs very rapidly. For example, the deformation illustrated in FIG. 27 would require rollers 162, 164 to fire up, then to fire down, and finally to fire up, all this occurring in the length of time it takes to pass between the upper and lower sets of rollers. In actuality, the way cycles are determined and the number of cycles desired to constitute a complete leveling job are programmable in the controller 264, as the user prefers.

In view of the variations that can be made in my invention, I intend that my invention is not to be limited to the exemplary embodiment herein depicted and described in detail, but only by the following claims.

I claim:

1. A circular saw blade straightening and tensioning machine for reducing or eliminating unevenness in circular saw blades, comprising:

a rotatable mounting adapted to rotatably support a circular saw blade;

a set of straightening and tensioning rollers adapted to be disposed on both sides of the saw blade, the axis of the set being concurrent with a radius of the saw blade, the set being movable along the radius of the saw blade from the center to the periphery thereof, the set comprising an upper shaft and a lower shaft, the upper and lower shafts being adapted to be disposed parallel to the upper and lower surfaces of the saw blade, respectively;

a hub mounted on one end of each of the upper and the lower shafts, each of the hubs comprising a center portion horizontally eccentric with respect to the centerline of its respective shaft and a pair of side portions disposed on opposite sides of the center portion, each of the side portions being horizontally eccentric with respect to the centerline of its respective shaft in a direction opposite to that of the center portion;

a roller rotatably mounted on each of the center and side portions of each of the hubs, each roller having the same outer diameter;

an actuator adapted to rotate each of the upper and lower shafts selectively ninety degrees in the clockwise and counterclockwise directions, rotation of the upper shaft in one of the clockwise and counterclockwise directions forcing the rollers on the side portions of the hub on the upper shaft downwardly against the upper surface of the saw blade, simultaneous rotation of the lower shaft in said one direction forcing the roller on the center portion of the hub on the lower shaft upwardly against the lower surface of the saw blade, the downward movement of the rollers on the side portions of the hub on the upper shaft combining with the upward movement of the roller on the center portion of the hub on the lower shaft to force upwardly a downwardly extending unevenness in the saw blade, rotation of the upper shaft in the other of the clockwise and counterclockwise directions forcing the roller on the center portion of the hub on the upper shaft downwardly against the upper surface of the saw blade, simultaneous rotation of the lower shaft in said other direction forcing the rollers on the side portions of the hub on the lower shaft upwardly against the lower surface of the saw blade, the downward movement of the roller on the center portion of the hub on the upper shaft combining with the upward movement of the rollers on the side portions of the hub on the lower shaft to force downwardly an upwardly extending unevenness in the saw blade, rotation of the lower shaft in said one of the clockwise and counterclockwise directions and simultaneous rotation of the upper shaft in the other of the clockwise and counterclockwise directions forcing the roller on the center portion of the hub on the upper shaft downwardly against the upper surface of the saw blade and the roller on the center portion of the hub on the lower shaft upwardly against the lower surface of the saw blade, the downward movement of the roller on the center portion of the hub on the upper shaft combining with the upward movement of the roller on the center portion of the hub on the lower shaft to exert a compression force on the saw blade; and a sensor adapted to scan one surface of the saw blade in advance of the set of rollers, said sensor being adapted to generate a signal to the rollers in the event of unevenness in the saw blade in either the upward or downward directions.

2. The circular saw blade straightening and tensioning machine of claim 1, wherein the set of rollers and the sensor are displaceable by the same distance towards the center or towards the periphery of the saw blade.

3. The circular saw blade straightening and tensioning machine of claim 2, wherein the sensor is positioned on a radius of the saw blade ninety degrees in advance of the radius of the saw blade with which the axis of the set of rollers is concurrent.

4. The circular saw blade straightening and tensioning machine of claim 3, further comprising a base, a threaded spindle mounted on the base, a motor adapted to rotate the spindle, and a first carriage adapted to mesh with the threaded spindle and to be driven therealong by the motor, the set of rollers being mounted on the first carriage, rotation of the spindle driving the first carriage to move the set of rollers along the radius of the saw blade.

5. The circular saw blade straightening and tensioning machine of claim 4, further comprising:

a track mounted on the base, the track making an angle of ninety degrees with respect to the axis of the threaded spindle;

a second carriage mounted on the track and being adapted to be driven therealong, the sensor being mounted on the second carriage; and chain means connecting the first and second carriages, whereby rotation of the spindle driving the first carriage in a direction toward or away from the center of the saw blade pulls the second carriage the same distance in said direction.

6. The circular saw blade straightening and tensioning machine of claim 5, wherein the chain means comprises:

a first sprocket and a second sprocket coaxially mounted on the base and adapted to rotate with respect thereto;

a first chain attached at its ends to the first carriage, the first chain being entrained around the first sprocket to rotate the same;

a second chain attached at its ends to the second carriage, the second chain being entrained around the second sprocket and adapted to be rotated therewith, whereby movement of the first carriage rotates the first chain and the first sprocket to cause rotation of the second sprocket and the second chain to cause movement of the second carriage a distance equal to the movement of the first carriage.

7. The circular saw blade straightening and tensioning machine of claim 4, further comprising:

a first arm pivotally mounted to the first carriage, the lower shaft of the set of rollers being supported by the first arm; and a second arm pivotally mounted to the first arm, the upper shaft of the set of rollers being supported by the second arm, whereby the upper and lower shafts of the set of rollers can be separated to permit the circular saw blade to be placed on the rotatable mounting and between the rollers.

8. The circular saw blade straightening and tensioning machine of claim 7, further comprising:

a first air cylinder mounted on the first arm;

a first piston disposed within the first air cylinder;

a first piston rod attached to the first piston and extending downwardly to sit on the first carriage, whereby retraction of the first piston rod permits the first arm to rotate downwardly to lower the lower shaft and the rollers mounted thereon and extension of the first piston rod rotates the first arm upwardly to raise the lower shaft and place the rollers mounted thereon adjacent the lower surface of the saw blade and in a working position.

9. The circular saw blade straightening and tensioning machine of claim 8, further comprising:

a generally vertical extension attached to the second arm, the extension extending above the second arm;

a second air cylinder mounted on the extension and depending therefrom;

a second piston disposed within the second air cylinder;

a second piston rod attached at its upper end to the second piston, the second piston rod being attached at its lower end to the second arm, whereby retraction of the second piston rod rotates the second arm upwardly to raise the upper shaft and the rollers mounted thereon and extension of the second piston rod rotates the second arm downwardly to lower the upper shaft and place the rollers mounted thereon adjacent the upper surface of the saw blade and in a working position.

10. The circular saw blade straightening and tensioning machine of claim 9, further comprising:

means to introduce a selected amount of air pressure into the upper end of the second air cylinder upon extension of the second piston rod to limit the amount of force applicable by the actuator through the set of rollers against the upper and lower surfaces of the saw blade to said selected amount of air pressure.

11. The circular saw blade straightening and tensioning machine of claim 1, wherein the sensor comprises:

a frame having at least three fixed foot supports, the fixed foot supports having contact surfaces for sliding along the upper surface of the saw blade, the contact surfaces of the fixed foot supports defining a flat plane;

a movable foot pivotally mounted from the frame generally centrally of the fixed supports and adapted to contact the upper surface of the saw blade intermediate the fixed foot supports at a point along said radius of the saw blade; and a gauge connected to the movable foot, the gauge being adapted to measure upward and downward deviation of the upper surface of the saw blade from said plane at said point along said radius and to generate a signal to the set of straightening and tensioning rollers proportional thereto.

12. The circular saw blade straightening and tensioning machine of claim 11, wherein the frame is generally rectangular, and the fixed foot supports comprise four fixed foot supports.

13. A circular saw blade straightening and tensioning machine for reducing or eliminating unevenness in circular saw blades, comprising:

a rotatable mounting adapted to rotatably support a circular saw blade;

a sensor adapted to move along a radius of the circular saw blade and to scan the upper surface thereof, the sensor comprising:

a frame having at least three fixed foot supports, the fixed foot supports having contact surfaces for sliding along the upper surface of the saw blade, the contact surfaces of the fixed foot supports defining a flat plane;

a movable foot pivotally mounted from the frame generally centrally of the fixed supports and adapted to contact the upper surface of the saw blade intermediate the fixed foot supports at a point along said radius of the saw blade;

a gauge connected to the movable foot, the gauge being adapted to measure upward and downward deviation of the upper surface of the saw blade from said plane at said point along said radius and to generate a signal proportional thereto; and a set of rollers adapted to be disposed on both sides of the saw blade and to exert upward and downward pressure on said saw blade at said point responsive to said signal generated by said gauge.

14. The circular saw blade straightening and tensioning machine of claim 13, wherein the frame is generally rectangular, and the fixed foot supports comprise four flat foot supports.

* * * * *